(12) United States Patent
Adams

(10) Patent No.: US 10,701,927 B2
(45) Date of Patent: Jul. 7, 2020

(54) BIRD DETERRING STRUCTURE AND METHOD

(71) Applicant: Russell S. Adams, Port Orange, FL (US)

(72) Inventor: Russell S. Adams, Port Orange, FL (US)

(*) Notice: Subject to any disclaimer, the term of this patent is extended or adjusted under 35 U.S.C. 154(b) by 0 days.

(21) Appl. No.: 16/420,894

(22) Filed: May 23, 2019

(65) Prior Publication Data
US 2019/0274297 A1    Sep. 12, 2019

Related U.S. Application Data

(63) Continuation-in-part of application No. 15/989,121, filed on May 24, 2018.
(Continued)

(51) Int. Cl.
*A01M 29/06* (2011.01)
*A01M 29/32* (2011.01)

(52) U.S. Cl.
CPC ............ *A01M 29/06* (2013.01); *A01M 29/32* (2013.01)

(58) Field of Classification Search
CPC .............................. A01M 29/06; A01M 29/32
(Continued)

(56) References Cited

U.S. PATENT DOCUMENTS

| 892,528 A | 7/1908 | Kricke |
| 1,167,502 A | 1/1916 | Huffman et al. |

(Continued)

FOREIGN PATENT DOCUMENTS

| EP | 127404 A1 * | 12/1984 | |
| GB | 306746 A * | 2/1929 | ............ A01M 29/06 |

(Continued)

OTHER PUBLICATIONS

Tillman, et al., Use of Vulture Carcasses and Effigies to Reduce Vulture Damage to Property and Agriculture, USDA APHIS Wildlife Services, National Wildlife Research Center, Florida Field Station, Gainesville, Florida, Proc. 20th Vertebr. Pest Conference (R.M. Timm and R.H. Smith, Eds.), Published at University of California Davis, 2002, pp. 123-128.

(Continued)

*Primary Examiner* — Babajide A Demuren
(74) *Attorney, Agent, or Firm* — Brian S. Steinberger; Hilary F. Steinberger; Law Offices of Brian S. Steinberger, P.A.

(57) ABSTRACT

Systems, devices, apparatus and methods for deterring birds and other animals from structures such as but not limited to cell towers, communications towers, buildings and areas to be protected. An effigy of the species to be deterred is suspended from an upper suspending structure and a lower suspending structure. The effigy can be molded or otherwise produced from rubber, plastic, or any other suitable material. The effigy can contain an internal supporting structure attached to a first cable and a second cable for suspending from the suspending structures. Either of the cables, or both, can include tensioning lines. Other embodiments include hangers and stands that can be attached to structures such as towers, buildings and the like. A C shaped hanger can be used for hanging an effigy which allows for the effigy to be able to move, such as rotate and simulate a live bird. A stand can allow for the effigy to pivot up and down which can simulate beak rising and falling, as well as the entire effigy being able to rotate in place.

14 Claims, 22 Drawing Sheets

Related U.S. Application Data

(60) Provisional application No. 62/510,486, filed on May 24, 2017.

(58) Field of Classification Search
USPC .................................................. 40/411–420
See application file for complete search history.

(56) References Cited

U.S. PATENT DOCUMENTS

| | | | | |
|---|---|---|---|---|
| 1,329,044 | A | * | 1/1920 | Farnam ................. A01M 29/06 40/412 |
| 1,428,216 | A | | 9/1922 | Chase |
| 2,294,241 | A | * | 8/1942 | Rober ................. A47G 33/0809 446/191 |
| 2,500,494 | A | | 3/1950 | Jeffers |
| 2,722,195 | A | * | 11/1955 | Rockafeller .......... A01M 29/06 116/22 A |
| 2,769,276 | A | | 11/1956 | Steiner |
| 3,085,545 | A | * | 4/1963 | Ore ....................... A01M 29/08 116/22 A |
| 4,109,605 | A | | 8/1978 | Bachli |
| 4,389,811 | A | | 6/1983 | Iwaya et al. |
| 5,895,893 | A | | 4/1999 | McMillian |
| 5,946,848 | A | | 9/1999 | Ysteboe et al. |
| 6,178,673 | B1 | | 1/2001 | Blackford et al. |
| 7,536,823 | B2 | | 5/2009 | Murray et al. |
| 7,654,217 | B2 | | 2/2010 | Sullivan |
| 7,930,989 | B2 | * | 4/2011 | Doty, III ............... A01M 29/06 116/22 A |
| 8,316,575 | B2 | | 11/2012 | Bradley |
| 8,479,678 | B1 | | 7/2013 | Sandoval et al. |
| 2002/0020101 | A1 | * | 2/2002 | Murray ................. A01M 31/06 43/3 |
| 2003/0121198 | A1 | | 7/2003 | Watermann |
| 2004/0194365 | A1 | * | 10/2004 | Summers .............. A01M 31/06 43/2 |
| 2005/0160654 | A1 | * | 7/2005 | Cosciani ............... A01M 31/06 43/2 |
| 2008/0184610 | A1 | | 8/2008 | Pfeifle |
| 2012/0174498 | A1 | | 7/2012 | Anderson, Jr. |
| 2015/0320030 | A1 | | 11/2015 | Sabine et al. |
| 2018/0368389 | A1 | | 12/2018 | Adams |

FOREIGN PATENT DOCUMENTS

| | | |
|---|---|---|
| JP | 2000354447 | 12/2000 |
| JP | 3091806 | 2/2003 |

OTHER PUBLICATIONS

Avery, et al., Dispersing Vulture Roosts on Communication Towers, USDA APHIS Wildlife Services, National Wildlife Research Center, Florida Field Station, 2820 East University Avenue, Gainesville, Florida 32641, U.S.A, J. Raptor Res. 36 (1): 45-50, copyrighted 2002, the Raptor Research Foundation, Inc., 6 pages.

Seamans, Thomas W., Resposnse of Roosting Turkey Vultures to a Vulture Effigy, The Ohio Journal of Science, v104, n5 (Dec. 2004), 136-138. http://hdl.handle.net/1811/25169, 4 pages.

Kalmbach, Edwin, R., First Director for the predecessor of the NWRC (1940-54), 'About Wildlife Services' National Wildlife Research Center brochure, NWRC, issued Mar. 2006, 2 pages.

Ball Steven A., Suspending Vulture Effigies from Roosts to Reduce Bird Strikes (2009), Human-Wildlife Interactions, 18, http://digitalcommons.unl.edu/hwl/18, 4 pages.

Humphrey, John S., et al., Guidelines for Using Effigies to Disperse Nuisance Vulture Roosts, Revised, Mar. 2010, 2 pages.

USDA, Vulture Deterrent Sources and Costs, Jan. 9, 2012, 1 page.

Bratton, Joanne, Corps Tries Effigies to Drive Vultures Away, Published 8:04 p.m. ET Mar. 20, 2013, 2 pages.

Novaes, Weber G., et al., Anthropogenic Features Influencing Occurrence of Black Vultures (*Coragyps atratus*) and Turkey Vultures (*Cathartes aura*) in an Urban Area in Central Amazonian Brazil, The Condor, 117(4): 650-659 (2015), https://doi.org/10.1650/CONDOR-15-56.1, Oct. 21, 2015, 9 pages.

Top 50 USAF Wildlife Strikes by Cost, Filtered for Only One Type of Species per Mishap FY1995-FY2016, 1 page.

Visual Scare Products, Margo Supplies Ltd, Wildlife Management Technology, https://www.margosupplies.com/usa/visual-scare, copyrighted 2018 Margo Supplies, 6 pages.

Adams, Russell, agl Media Group, Of Birds and Business: Ways to Keep Your Tower Bird-Free, https://aglmediagroup.com/of-birds-and-business-ways-to-keep-your-tower-bird-free, Jul. 3, 2018, 3 pages.

Air Force Safety Center, Bird/Wildlife Aircraft Strike Hazard (BASH), https://safety.af.mil/Divisions/Aviation-Safety-Division/BASH/, retrieved from the Internet on May 21, 2019, 5 pages.

How to Deter Vultures, Department of Forestry and Natural Resources, https://forestryca.uky/edu/, retrieved from the Internet May 21, 2019, 2 pages.

Dead Crow Bird Scare Decoy, Crow Deterrent, Scare Away Flocks of Crows—20" tall, https://birdfighter.com/index.php/dead-crow-bird-scare-decoy . . . retrieved from the internet May 21, 2019, 4 pages.

Turkey Vulture, Dead Vulture Bird Scare Decoy, https://birdfighter.com/index.php/pest-birds/pest-bird-turkey . . . retrieved from the internet May 21, 2019, 4 pages.

Attack Eagle Decoy, May 21, 2019, 4 pages.

"OFF"-sprey Raptor Deterrent, Products/Services, retrieved from the internet May 21, 2019, 2 pages.

PCT Search Report, PCT Application No. PCT/US19/33810, dated Sep. 24, 2019, 14 pages.

* cited by examiner

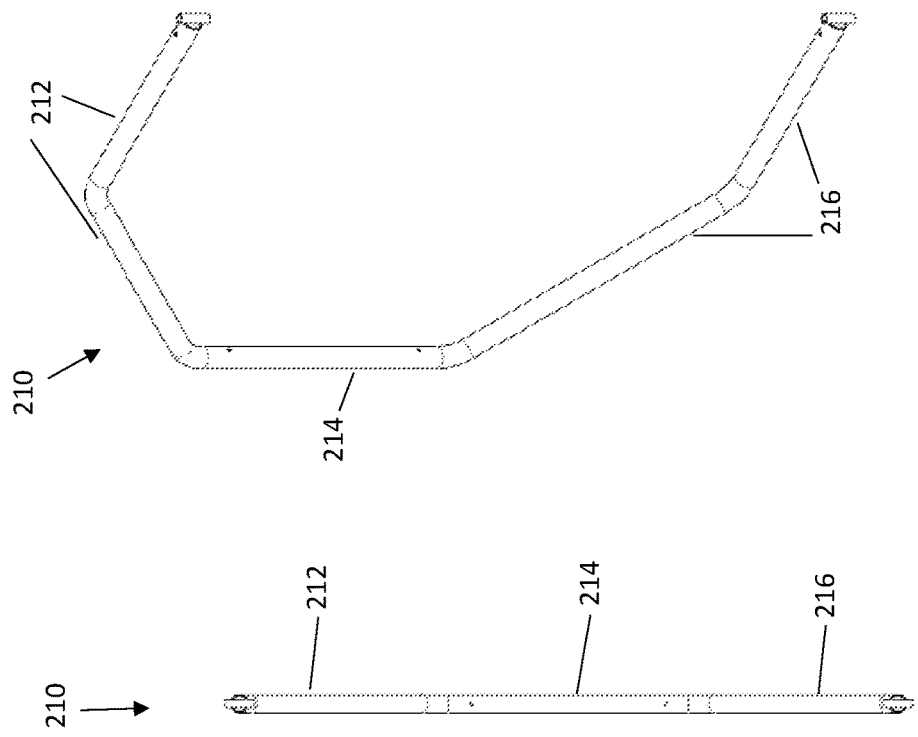
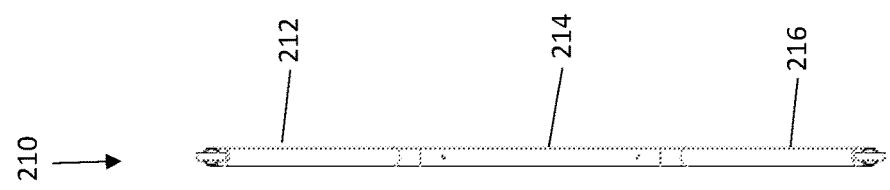
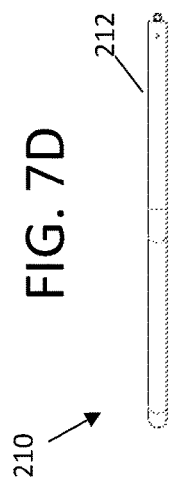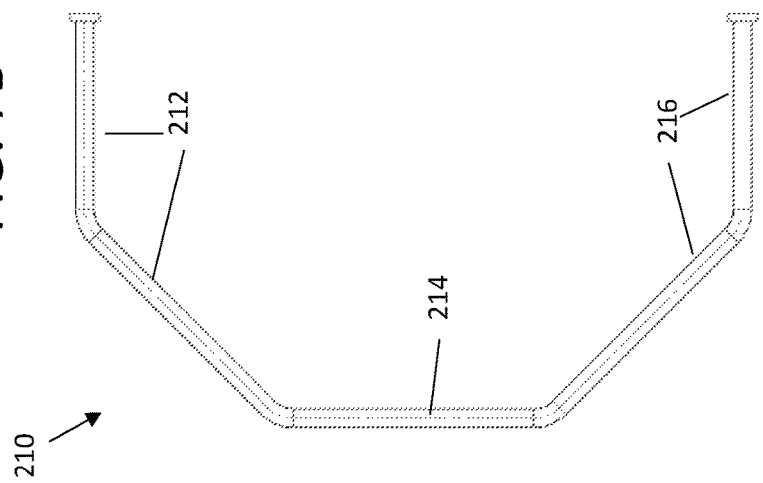

FIG. 8B
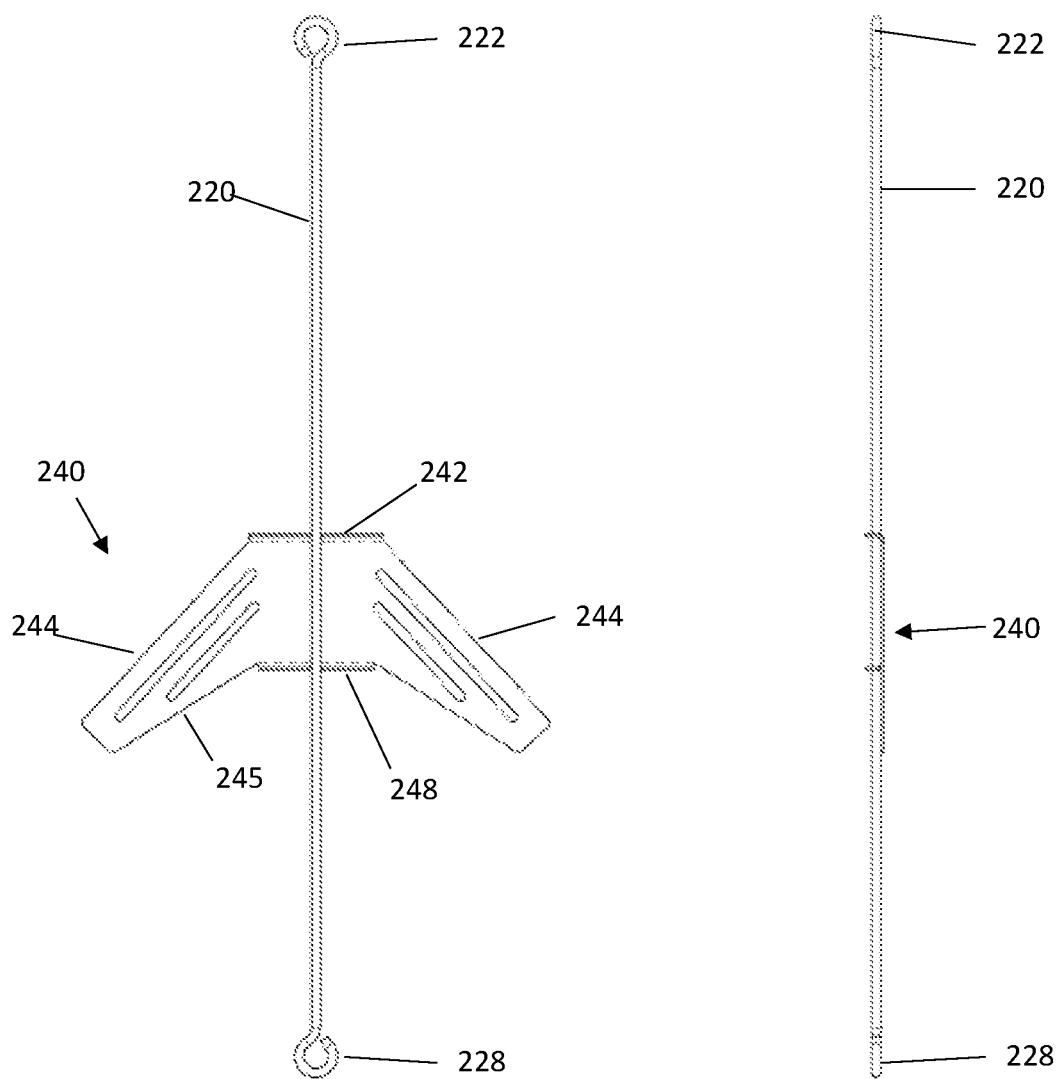
FIG. 8C
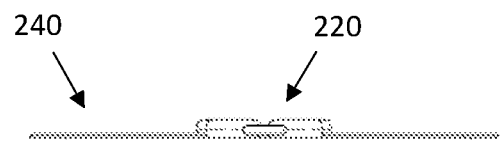
FIG. 8D

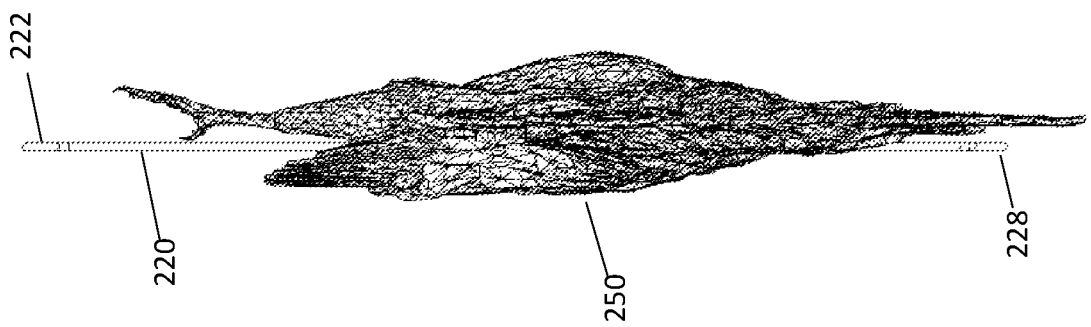
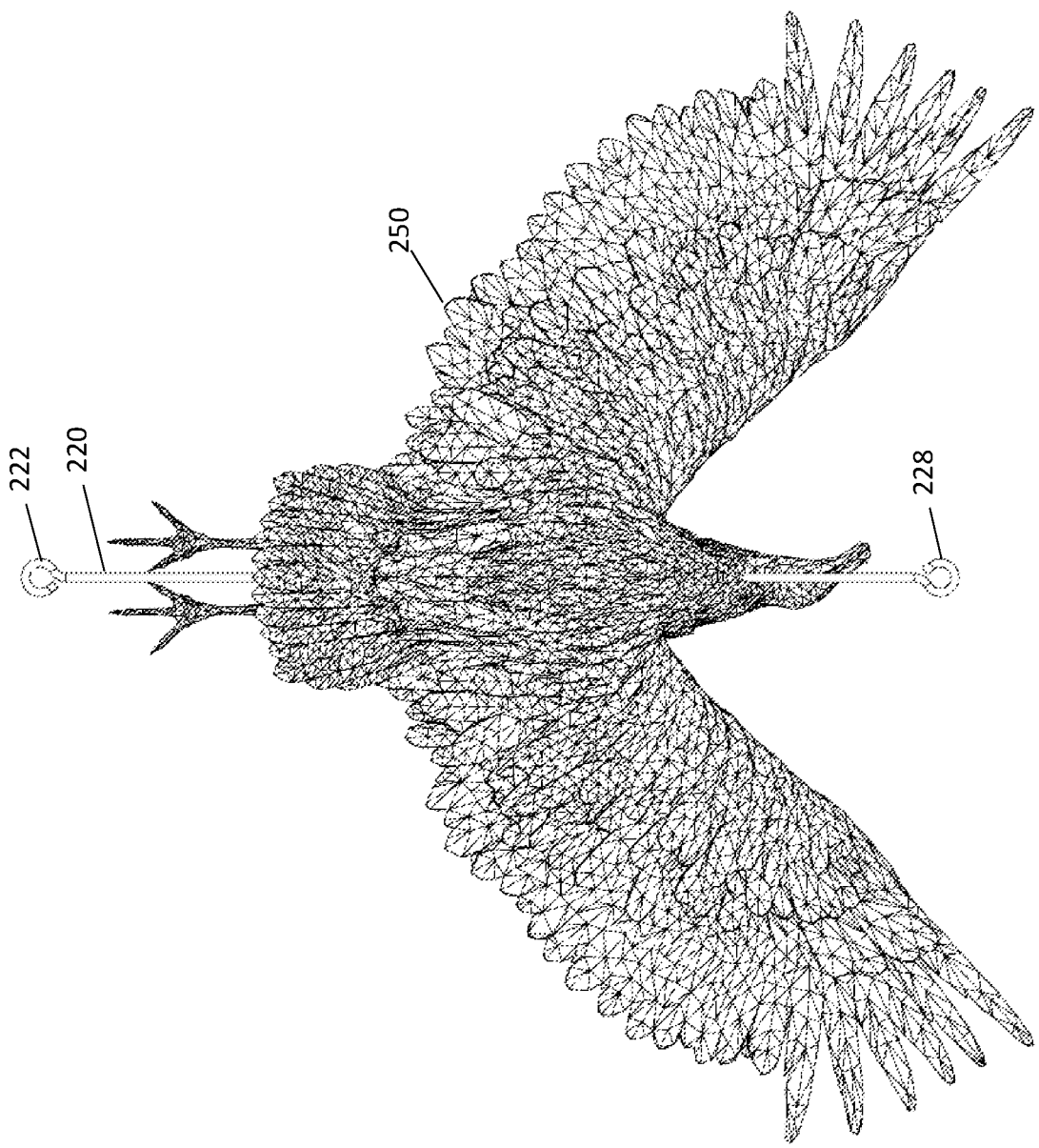

FIG. 11C
(PRIOR ART)
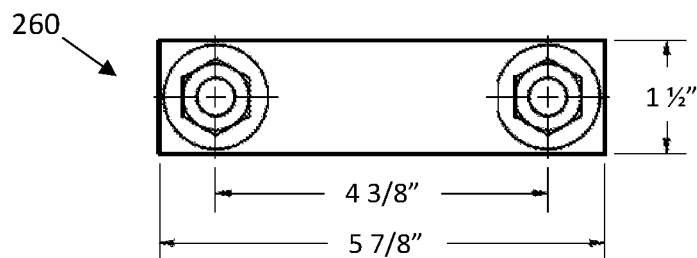
FIG. 11B
(PRIOR ART)
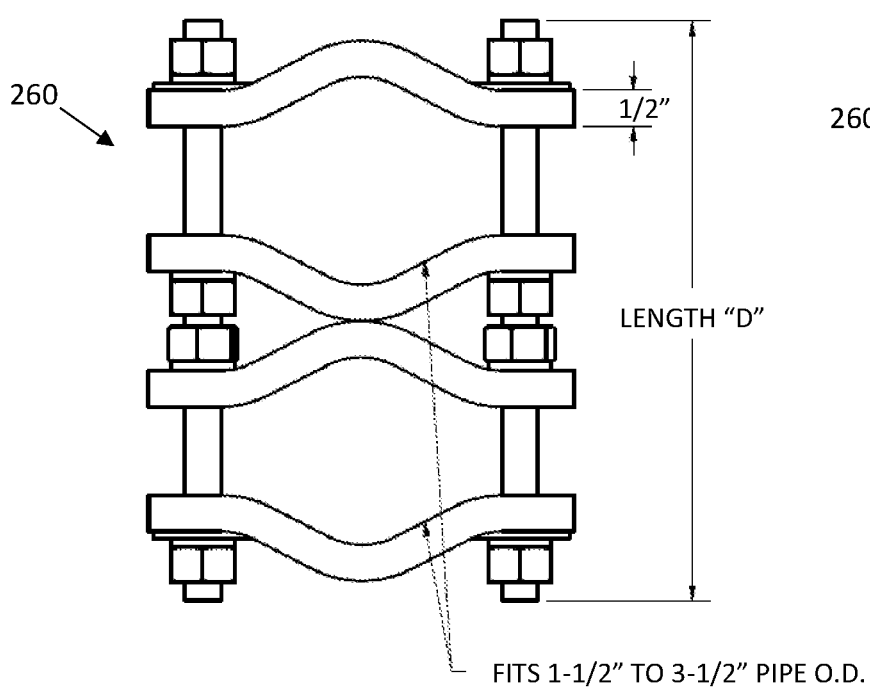
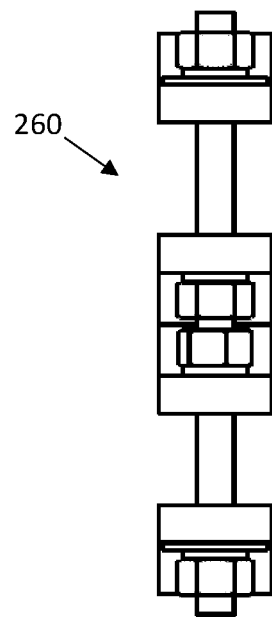
FIG. 11A
(PRIOR ART)

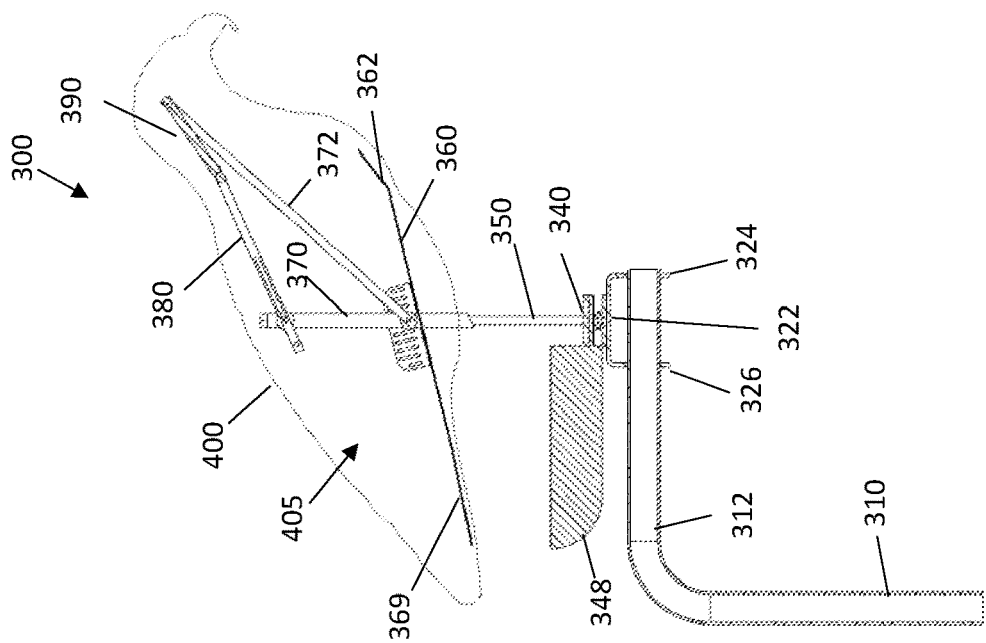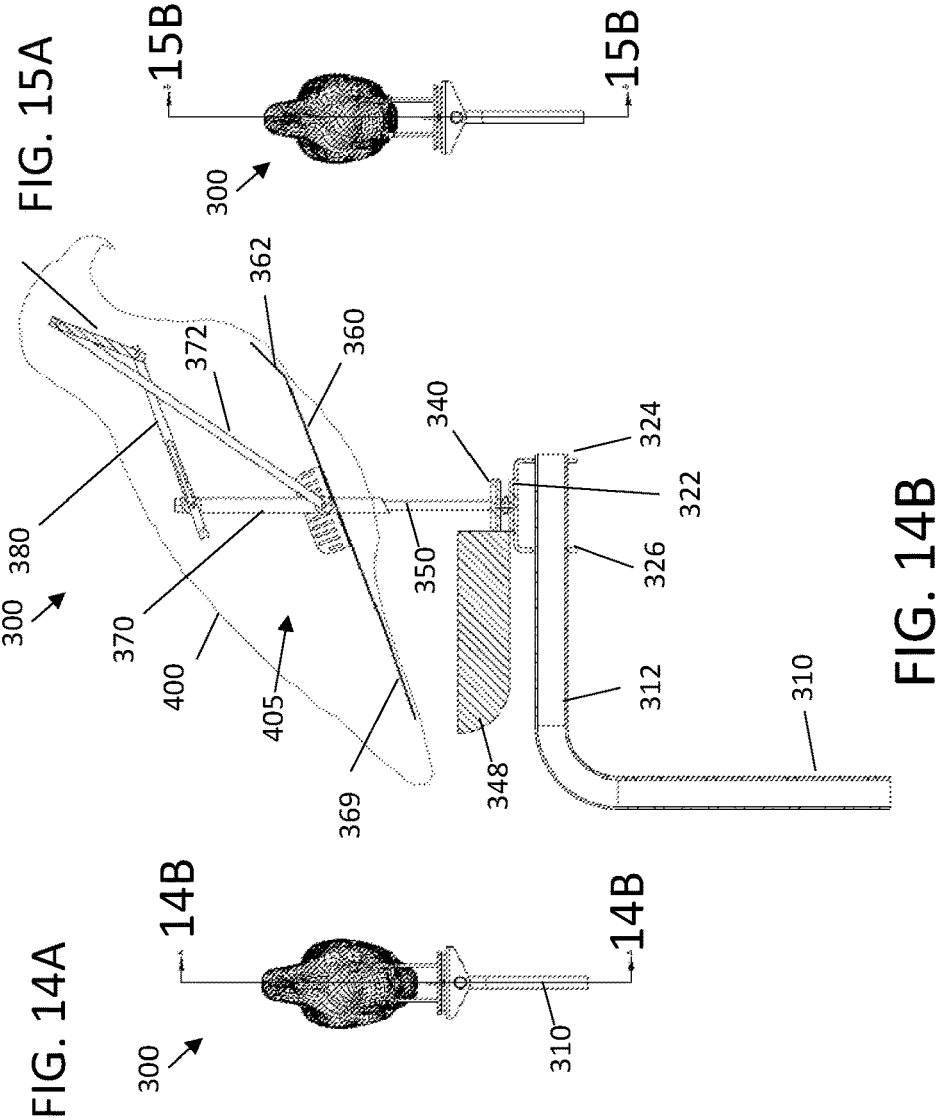

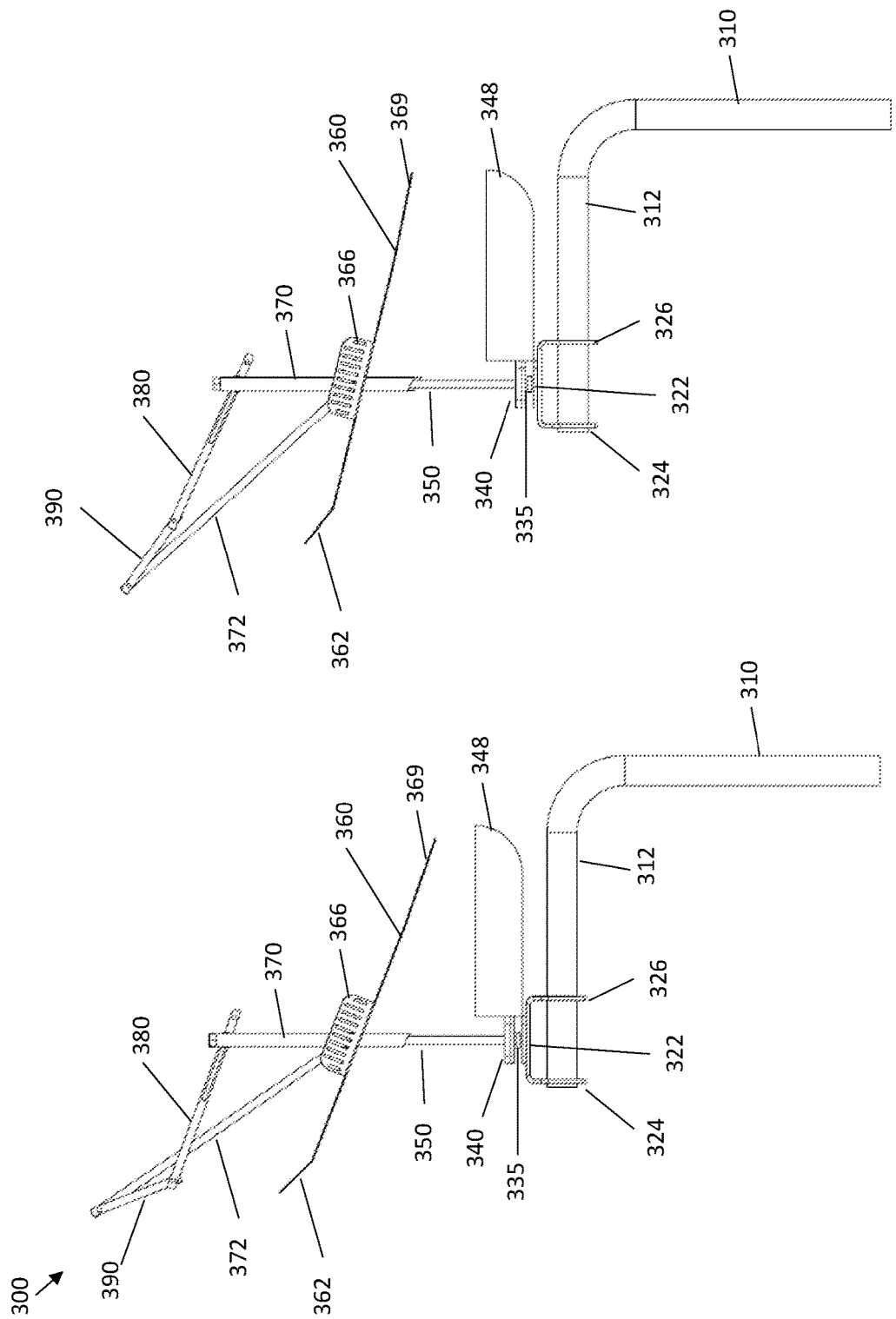

BIRD DETERRING STRUCTURE AND METHOD

CROSS REFERENCE TO RELATED APPLICATIONS

This application is a Continuation-In-Part of U.S. patent application Ser. No. 15/989,121 filed May 24, 2018, which claims the benefit of priority to U.S. Provisional Application Ser. No. 62/510,486 filed May 24, 2017. The entire disclosure of each of the applications listed in this paragraph are incorporated herein by specific reference thereto.

FIELD OF INVENTION

This invention relates to deterring birds and animals, and in particular to systems, devices, apparatus and methods for preventing birds and animals from areas and structures, such as but not limited to buildings, cell towers and communication towers. The invention is adapted to keep birds, for example vultures such as but not limited to turkey vultures and black vultures, eagles, osprey, owls, turkey vultures, and/or birds of prey from congregating in an area where one of their own species has been injured or killed. The invention is particularly useful to protect areas or structures that are susceptible to damage from birds, such as, for example, buildings, masts, or radio towers such as cell telephone towers or beacon towers which can comprise antennas or sensitive electronics. By keeping animals such as, for example and not by way of limitation, birds, from congregating in such areas, damage from the birds, their talons, and their droppings can be prevented.

BACKGROUND AND PRIOR ART

Over the years birds and animals have been known cause billions of dollars in damage, maintenance, repairs, liability, and health risks each year. Birds of prey such as vultures are known to roost on communication and broadcast towers, as well as power and communication lines. Defecations by roosting vultures have been known to interfere with the operation of expensive equipment and create unsafe and unpleasant conditions for workers who climb the towers to service and install equipment. Furthermore, businesses and homeowners adjacent to vulture roosts can be adversely affected by vulture droppings and unpleasant odors.

Various types of deterrents have been applied over the years, such as noise making devices, chemicals, and visual deterrent objections.

However, using noisemakers and pyrotechnics are not desirable since they can be disruptive to neighboring businesses and homeowners and provide limited release.

Chemical deterrents are impractical because of the large perching areas, and would also interfere with operation and maintenance on the towers, and can be dangerous to workers as well as the neighboring public.

Other deterrents, such as visual objects, such as reflecting tape and balloons can be impractical to apply and would not be effective with different types of birds, and the like.

Research in has noted that suspending carcasses of real dead vultures proved to be a highly efficient method for controlling bird activity on or around the tested towers. Avery et al., Dispersing Vulture Roosts on Communication Towers, J. Raptor Res. 36(1), pages 45-50 2002

While shown to be effective, the securing and suspending of actual dead vulture carcasses from communication towers and other structure would not be practical in all applications and would not be a long-term solution. Suspending carcasses can also represent a bio-hazard, and in any even such carcasses rot and decay, and are not long lasting.

Also, in order to procure such carcasses in the quantities that are commercially feasible, large number of animals would necessarily be killed in order to provide the carcasses. Such treatment of live animals may be considered to be inhumane.

Thus, the need exists for solutions to the above problems with the prior art.

SUMMARY OF THE INVENTION

A primary objective of the present invention is to provide systems, devices, apparatus and methods for deterring birds and other animals from structures such as but not limited to cell towers, communications towers, buildings and areas to be protected by suspending replica effigies of the birds to be deterred.

A secondary objective of the present invention is to systems, devices, apparatus and methods for deterring birds and other animals from areas to be protected, by mounting moveable replica bird effigies which can vibrate and/or oscillate that appear to mimic live birds that are struggling in place.

A third objective of the present invention is to systems, devices, apparatus and methods for deterring birds and other animals from areas to be protected, by mounting moveable replica bird effigies which can pivot up and down and/or swivel that appear to mimic live birds that are struggling in place.

The present invention can include systems, devices, apparatus and methods that have one or more of the following features and/or steps, which alone or in any combination may comprise patentable subject matter.

The present invention overcomes the shortcomings of the prior art in that it helps reduce, and, in many cases, eliminate, the hazards and damage associated, for example, with bird droppings by helping to eliminate the primary cause of these droppings—the birds themselves. It is desired to keep such unwanted birds from collecting in, on or near a subject structure.

When the systems, devices, apparatus and methods of the present invention are employed, for example, in cell and communication tower applications, the unwanted birds can become agitated and confused, and quickly migrate to another property or structure that presents a less threatening sight picture.

To an approaching bird, the effigy of the invention looks life-like or lifeless depending upon the effigy, often creating a confused and agitated state in the approaching unwanted birds. These agitated and confused emotions are easily transferred bird-to-bird exponentially creating confusion among an approaching flock, and thereby causing the flocks to move on to another location. In this manner the effigy, and its manner of use, cause the deterring of unwanted birds from the subject structure.

The effigies of the present invention can be molded from any material such as plastic, resin or rubber materials or compounds, or can be fabricated from any other material and by any other means in the art, and thus eliminates the inhumane treatment of animals and the potential biohazards associated with handling dead carcasses.

Use of the systems, devices, apparatus and methods of the invention to deter birds from entering subject areas or structures is a humane approach to unwanted bird deterrence. Other methods of deterring unwanted birds or other animals, such as the use of firearms, explosives, loud noises or other means can be harmful to the birds and may present a danger to the users themselves.

Subject structures such as cellular telephone or communication towers using the apparatus and method of the invention can thus safely and effectively keep unwanted birds or other animals from causing damage to such subject structures. Towers that are free of unwanted birds are not only safer to work upon and service, but the associated communications equipment suspended on or near these towers tend to have a longer in-service life as a result of being free from bird droppings and other damage cause by unwanted birds or other animals.

In accordance with one embodiment of the present invention intended to deter birds, the invention comprises an effigy of a bird that is attached to a subject structure for the purpose of making it appear as if it is a dead bird. An internal structure, disposed within the body of the effigy and to which the effigy is attached, is typically, but not necessarily, attached to a first cable and a second cable for suspending the effigy of the invention from an upper suspending structure portion and a lower suspending structure portion, which may or may not be the structure that it is intended to protect. The first cable may be attached to the upper suspending structure, and the second cable may be attached to a lower suspending structure. Either of the cables, or both, can include components for tensioning the cable so that the effigy does not sway due to environmental conditions such as weather, for example wind, rain, blowing snow or ice or other environmental conditions. The effigy internal structure may be molded in place within the effigy so as to provide a supporting structure for hanging the effigy. Non-limiting examples of exemplary effigy internal structures are depicted in the figures of the drawings.

The invention also comprises a method for deterring unwanted birds or animals from a subject structure or an area. In an embodiment the method can include the steps of providing an effigy comprising an internal supporting structure having a distal and proximate ends and having a first cable attached to the distal end and a second cable attached to the proximate end; suspending the effigy by attaching said first cable to an upper suspending structure, and attaching said second cable to a lower suspending structure; and tensioning either of the first or second cable such that said effigy does not sway due to environmental conditions.

The effigy can represent any bird or animal, including any animal that is desired to be deterred, and is typically, but not necessarily, an effigy of a dead animal of the species desired to be deterred.

The present systems, devices, apparatus and methods of the invention overcome the shortcomings of the prior art by providing, in an embodiment, a system and method for disposing a bird effigy in a position such that it appears to be dead and thus has a repelling effect on unwanted birds. In an embodiment, the effigy may be suspended from a structure in a head down orientation.

Another embodiment can include a hanger system with a moving bird effigy replica, for deterring birds, that can comprise a hanger bracket having an upper end and a lower end, a bird effigy supported in the hanger bracket between the upper end and the lower end, and a mount mechanism for attaching the hanger bracket to a support structure, wherein the bird effigy is movable within the hanger bracket.

The hanger bracket can include a C shaped bracket, with the upper end being an upper exposed end of the C shaped bracket, and the lower end being a lower exposed end of the C shaped bracket.

The hanger system can further include an elongated rod having a top and a bottom, the rod passing through the effigy, so that the top is rotatably attached to the upper exposed end of the C shaped bracket, and the bottom is rotatably attached to the lower exposed end of the C shaped bracket. The top of the elongated rod can include a top hook, and the bottom of the elongated rod includes a bottom hook.

The hanger system can further include an armature plate attached to a mid portion of the elongated rod between the top and the bottom, the armature plate imbedded in the effigy. The armature plate can include a wing shape configuration.

The hanger system can further include a chain attached between the bottom hook and the lower exposed end of the C shaped bracket. The mount mechanism can include a clamp for attaching the hanger system to the support structure.

Another embodiment can be a stand system with a moving bird effigy replica, for deterring birds, that can include a post having an upper end with a ledge, and a lower end, a bird effigy, a movable mechanism for attaching the bird effigy to the ledge on the post, the movable mechanism for allowing the bird effigy to move relative to the ledge on the post, and a mount mechanism for attaching the post to a structure.

The moveable mechanism can include an armature plate imbedded in the bird effigy. The moveable mechanism can include a rotating member for allowing the bird effigy to rotate relative to the ledge on the post. The rotating member can include bearings for allowing one member to rotate relative to another member.

The stand system can further include a rudder extending rearwardly from the bird effigy, wherein wind against the rudder allows the bird effigy to rotate relative to the ledge on the post.

The stand system can further include a pivot mechanism for allowing the bird effigy to pivot up and down relative to the ledge on the post. The pivot mechanism can include pivoting rods attached to the armature plate and to the ledge on the post.

A method of making a moveable bird effigy, can include the steps of providing a mold having a shape of a bird effigy, inserting an armature plate in the mold, injecting or pouring a curable material, such as but not limited to resin, and the like, into the mold, curing the resin and armature plate together to form the bird effigy, mounting the cured bird effigy on a support structure, and moving the cured bird effigy relative to the support structure.

The method can further include the steps of providing an elongated rod having a top and a bottom, and attaching the armature plate to the elongated rod before the step of inserting the armature plate into the mold.

The mounting step can include the steps of providing a hanger bracket having an upper exposed end and a lower exposed end, attaching the top of the elongated rod to the upper exposed end of the hanger bracket, and attaching the bottom of the elongated rod to the lower exposed end of the hanger bracket.

The step of providing the hanger bracket can include the step of providing a C shaped bracket as the hanger bracket.

The moving step can include the steps of rotating the bird effigy relative to the support structure, and pivoting a head portion of the bird effigy up and down relative to the support structure.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 7A is a perspective view of the C shaped hanger bracket shown in FIG. 6A.

FIG. 7B is a front view of the C shaped hanger bracket shown in FIG. 7A.

FIG. 7C is a left side view of the C shaped hanger bracket shown in FIG. 7A.

FIG. 7D is a top view of the C shaped hanger bracket shown in FIG. 7A.

FIG. 8B is a front view of the support rod and wing armature plate of FIG. 8A.

FIG. 8C is a side view of the support rod and wing armature plate of FIG. 8A.

FIG. 8D is a top view of the support rod and wing armature plate of FIG. 8A.

FIG. 9B is a front view of the support rod and armature plate of FIG. 8A mounted in the suspended bird of FIG. 9A.

FIG. 9C is a side view of the support rod and armature plate of FIG. 8A mounted in the suspended bird of FIG. 9A.

FIG. 11A is an enlarged front view of a prior art pipe to pipe clamp mount used to attach the C shaped hanger bracket to the support leg on the cell/communications tower shown in FIG. 10.

FIG. 11B is a left side view of the pipe to pipe clamp mount of FIG. 11A.

FIG. 11C is a top view of the pipe to pipe clamp mount of FIG. 11A.

FIG. 14A is a front head view of the stand support for a moveable bird effigy replica embodiment of FIG. 12A with effigy head raised.

FIG. 14B is a cross-sectional view of the stand support for a moveable bird effigy replica embodiment of FIG. 14A along arrows 14B.

FIG. 14C is a left side view of the stand support for a moveable bird effigy replica embodiment of FIG. 14B without the effigy.

FIG. 15A is another front head view of the stand support for a moveable bird effigy replica embodiment of FIG. 12A with effigy head lowered.

FIG. 15B is a cross-sectional view of the stand support for a moveable bird effigy replica embodiment of FIG. 15A along arrows 14B.

FIG. 15C is a left side view of the of the stand support for a moveable bird effigy replica embodiment of FIG. 14B without the effigy.

DESCRIPTION OF THE PREFERRED EMBODIMENTS

Figure 1:
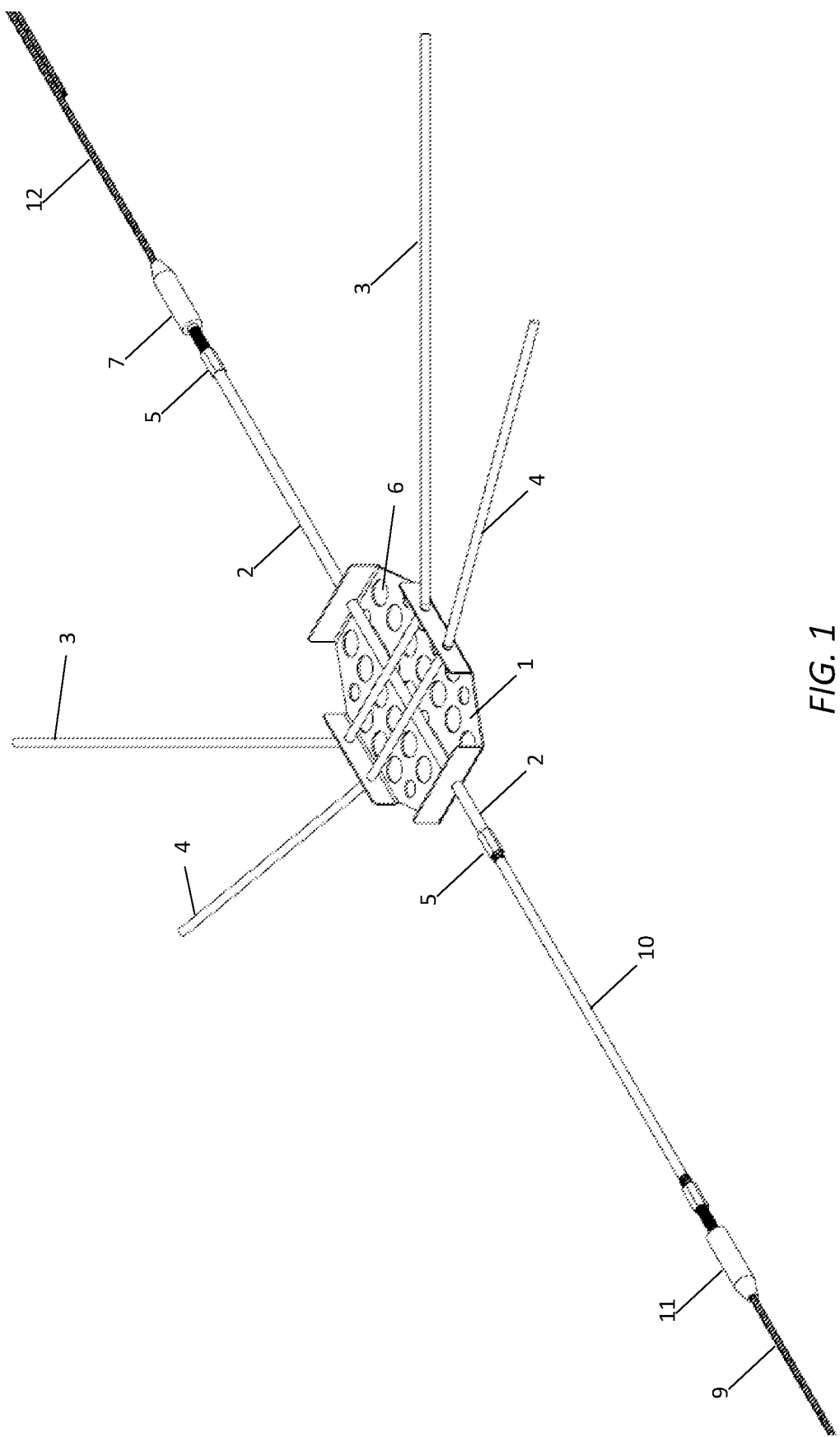
FIG. 1 depicts a perspective view of the internal structure of an embodiment of the invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

As used herein, "effigy" includes within its meaning a replica of a dead bird or other animal of any species, or a live bird or other animal or any species, which can be fabricated from any material, but for example, may be fabricated from a rubber or plastic material. The effigy is preferably, but not necessarily, a three dimensional effigy having an outer surface in the three-dimensional shape of a live or dead bird or other animal.

In an embodiment, the invention can comprise a bird-shaped effigy comprising an internal supporting structure for supporting the features of the effigy, such as wings, and for suspending the effigy from a supporting structure. In further embodiments, the bird-shaped effigy may further comprise an internal support structure that is attached either directly or indirectly to a supporting cable, and wherein the supporting cable is attached to the supporting structure for suspending said effigy from the supporting structure. In still further embodiments, the internal effigy support structure may comprise attachments to a first cable for attaching to an upper suspending structure and a second cable for attaching to a lower suspending structure, and can include, in either the first or second cable, components for tensioning the cable or cables.

In still further embodiments, the bird-shaped effigy is further defined as having a plurality of wings, wherein the at least one extending element is further defined as a plurality of supporting elements, one or more supporting elements for each wing of the bird-shaped effigy. The structure may be further defined as being completely contained internally in the shaped effigy. The effigy may further be defined as providing the appearance of a dead bird. The effigy may further be defined as representing in a specific species of animal or bird including, for example, a turkey buzzard, vulture, eagle, osprey, hawk or other species.

A list of the components will now be described.
1 Internal support structure central element
2 elongate rod
3, 4 supporting elements
5 connectors
6 plurality of holes
9 first cable
10 optional connection rod
11 connector
12 second cable
13 plate
14 bracket
15 threaded rod
16 optional cable tightening feature
100 effigy
101 subject structure
102 unwanted bird
103 upper suspending structure
200 hanger bracket for suspending moveable effigy bird embodiment
210 C shaped hanger bracket
211 top eye bolt
212 upper legs
214 back leg
216 lower legs
219 bottom eye bolt
220 elongated rod
222 upper hook
228 lower hook
230 chain
240 wing plate
242 top bent edge
244 side wings
245 slots
248 bottom bent edge
250 replica effigy bird (such as but not limited to a vulture)
260 pipe to pipe clamp mount
270 cell/communication tower
272 vertical support on tower 260
300 stand support for moveable bird effigy replica embodiment
310 vertical post
312 upper horizontal leg
320 ledge mounting armature plate
322 top plate portion
324 front bent edge
326 rear bent edge
330 bottom swivel mount base plate
335 bearings
338 upper swivel mount base plate
340 effigy base
348 effigy rudder
350 effigy support legs
360 effigy body armature plate
362 bent tip portion
363 support holes
364 wings
365 slots
366 bent wing edges
369 rear portion
370 effigy vertical support rods
371 inner side openings for axle 374
372 rocker arm
374 axle on bottom of rocker arm
376 upper pivot end
380 horizontal slider arms
382 effigy support axle
383 elongated inner end slots in slider arms 380
390 front support posts
392 lower pivot ends on front support posts
400 bird replica effigy
405 hollow inside portions of effigy 400

Referring now to FIG. 1, an embodiment of the internal support structure of the invention is depicted. This internal support structure may be utilized to provide structural support for the effigy as it is suspended from a structure to be protected, or "subject structure", such as a cell or communication tower, or from a nearby structure. Internal support structure central element 1 may be attached to supporting elements 3 and 4 such that supporting elements 3 and 4 are disposed to extend away from internal support central element 1. Elongate rod 2 can extend through central element 1 forming distal and proximate ends which terminate in connectors 5 for attaching to a first cable 9 or second cable 12, or both, or, alternatively, optional extension rod 10.

Connector 11 can attach cable 9 to extension rod 10. Use of optional extension rod 10 allows for the adapting of the internal support structure to various sizes and shapes of birds. First and second cables 9 and 12 may be utilized to suspend the effigy from any structure such as a tree, a communication equipment tower, building structure, or any other structure for which is desired to deter birds or other animals from approaching, nesting in, or alighting upon. For example, first cable 9 may attach to an upper suspending structure, and second cable 12 may attach to a lower suspending structure. Internal support structure central element 1 is depicted in exemplary fashion in FIG. 1 as being fabricated from sheet metal with formed, bent side walls.

However, FIG. 1 can be fabricated from any material, and formed in any shape that provides sufficient strength to support the supporting elements 3 and 4, and rod 2. Thus, internal support structure central element 1 can be welded, cast, molded, assembled from multiple components; can be fabricated from composite materials, metal, plastics or any other material; and may take any shape as long as it provides sufficient strength to support the supporting elements 3 and 4, and rod 2.

In certain alternate embodiments in which internal support structure central element 1 can be fabricated from a sheet material, it may comprise at least one cutout or hole of arbitrary shape 6 in order to lighten the structure. In the exemplary embodiment depicted in FIG. 1, internal support structure central element 1 comprises a plurality of holes 6. In an embodiment, the outer surface of the effigy 100 may enclose internal support central element 1 and the supporting elements 3 and 4. Thus the internal support structure may comprise internal support structure central element 1, supporting elements 3 and 4, rod 2, and optional extension rod 10.

Figure 2A:
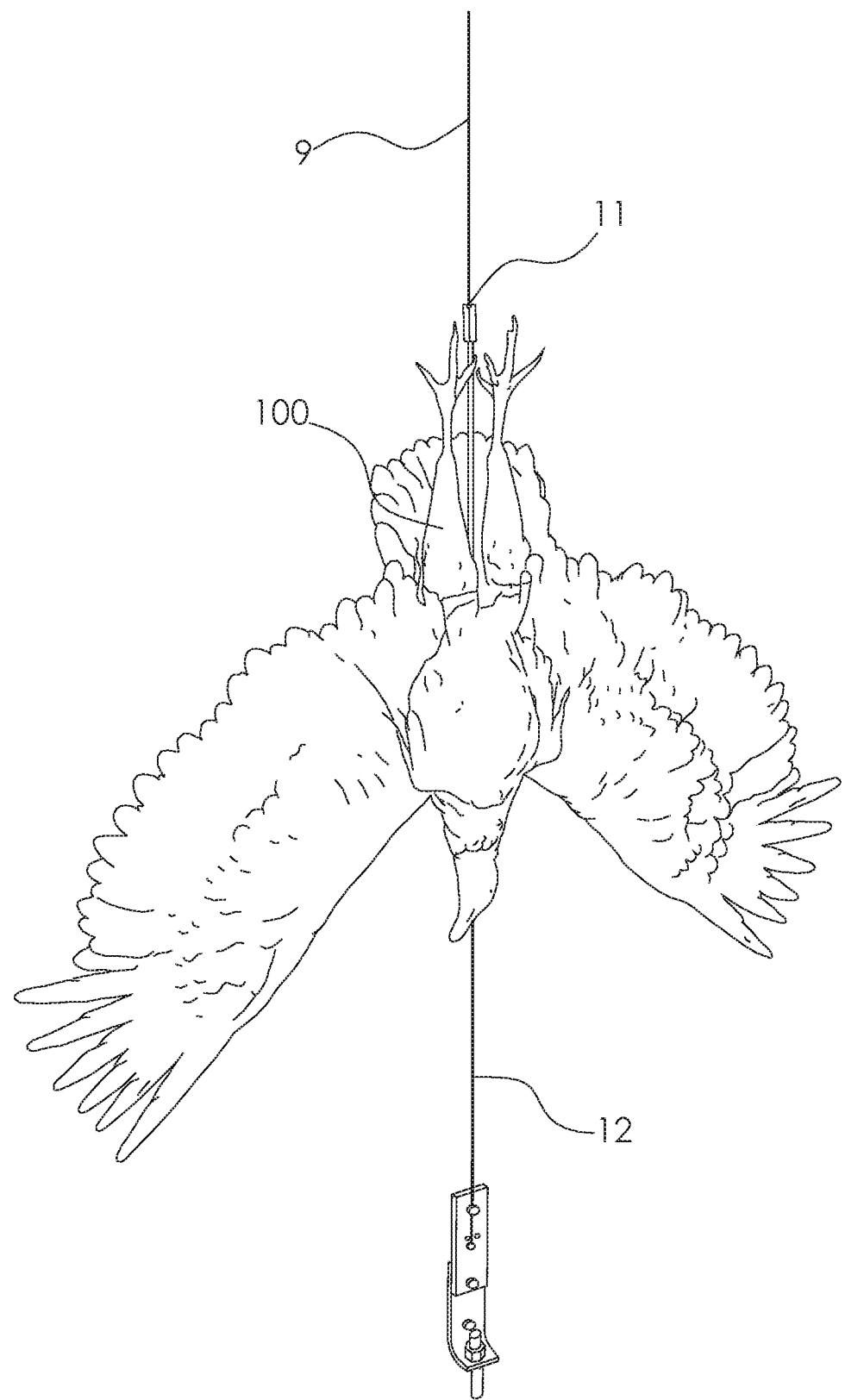
FIG. 2a depicts a perspective view of an embodiment of a bird effigy of the invention attached to cables.

Referring now to FIG. 2a, an effigy 100 is depicted suspended from first cable 9 and second cable 12. The internal support structure is embedded within the effigy 100. In a typical application, the effigy 100 is suspended head downward, although this is not necessary. In a downward-oriented suspension, first cable 9 is attached to an upper suspending structure such as a portion of a cell or communication tower, tree or other structure. Second cable 12 can be attached to a lower suspending structure and can comprise components for adjusting to provide tension in the cables in order to keep the effigy from swaying in the wind and causing damage to the structure. Connector 11 is shown for reference. In FIG. 2a, the head of effigy 100 is in the downward position.

Figure 2B:
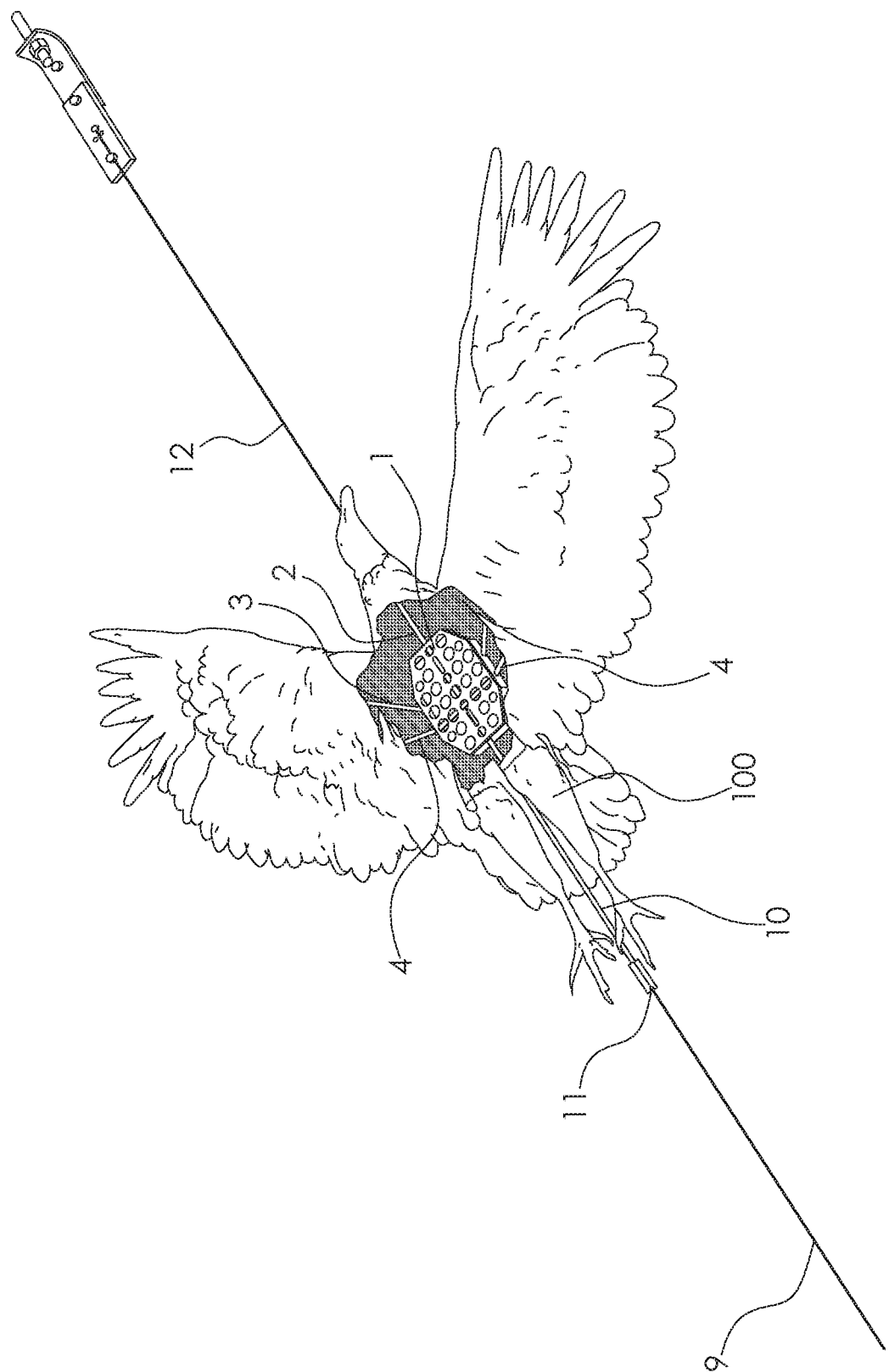
FIG. 2b depicts a cut away view of an embodiment of a bird effigy of the invention attached to cables, showing the internal structure of the invention.

Referring now to FIG. 2b, a cutaway view of effigy 100 is depicted, allowing the internal supporting structure to be seen. The internal support structure may be, but is not necessarily, embedded completely within the effigy 100. This can be accomplished, for example, by molding the internal support structure into the effigy 100 during the fabrication process. The "internal support structure" can be defined as the structure attached to in and internal to the effigy that provides mounting points and supporting structure internal to the effigy so as to keep effigy portions such as wings or other effigy features from sagging due to the force of gravity when the effigy is suspended.

In the exemplary embodiment of the invention depicted in the drawings, the internal support structure can comprise internal support structure central element 1, supporting elements 3 and 4, and rod 2. An exemplary process may be described as creating a mold for the effigy 100, placing the internal support structure within the mold, and molding the effigy around the internal support structure so that only cable 12 and extension rod 10 extend outside of molded effigy 100.

Extending supporting elements 3 and 4, which are attached to central element 1, can extend into a feature of the effigy 100 such as the wing area of a bird, providing support for each wing. In the example shown in FIG. 2b, it can be seen that the wings of the effigy 100 can, in some embodiments, represent a large amount of mass of the effigy 100, thus requiring internal support from extending elements 3 and 4. Some effigies, which are smaller, cannot require extending support elements 3 or 4. Other effigies, which may be larger representing larger species of birds or animals, may require at least one or a plurality of extending support elements 3 and 4 to support each of the features of the effigy, such as, for example, a wing. It is to be understood that the scope of the invention includes all sizes of birds and animals, and that other types of animals may be represented by effigies having particular structural needs, thus, the scope of the invention includes any number of extending support elements 3 or 4 to support features of such effigies, and that the effigy 100 depicted in the figures of the drawing is but one example of many effigies included within the scope of the invention. Connector 11 is shown for reference. Rod 2 and first cable 9 are depicted for reference.

Figure 3:
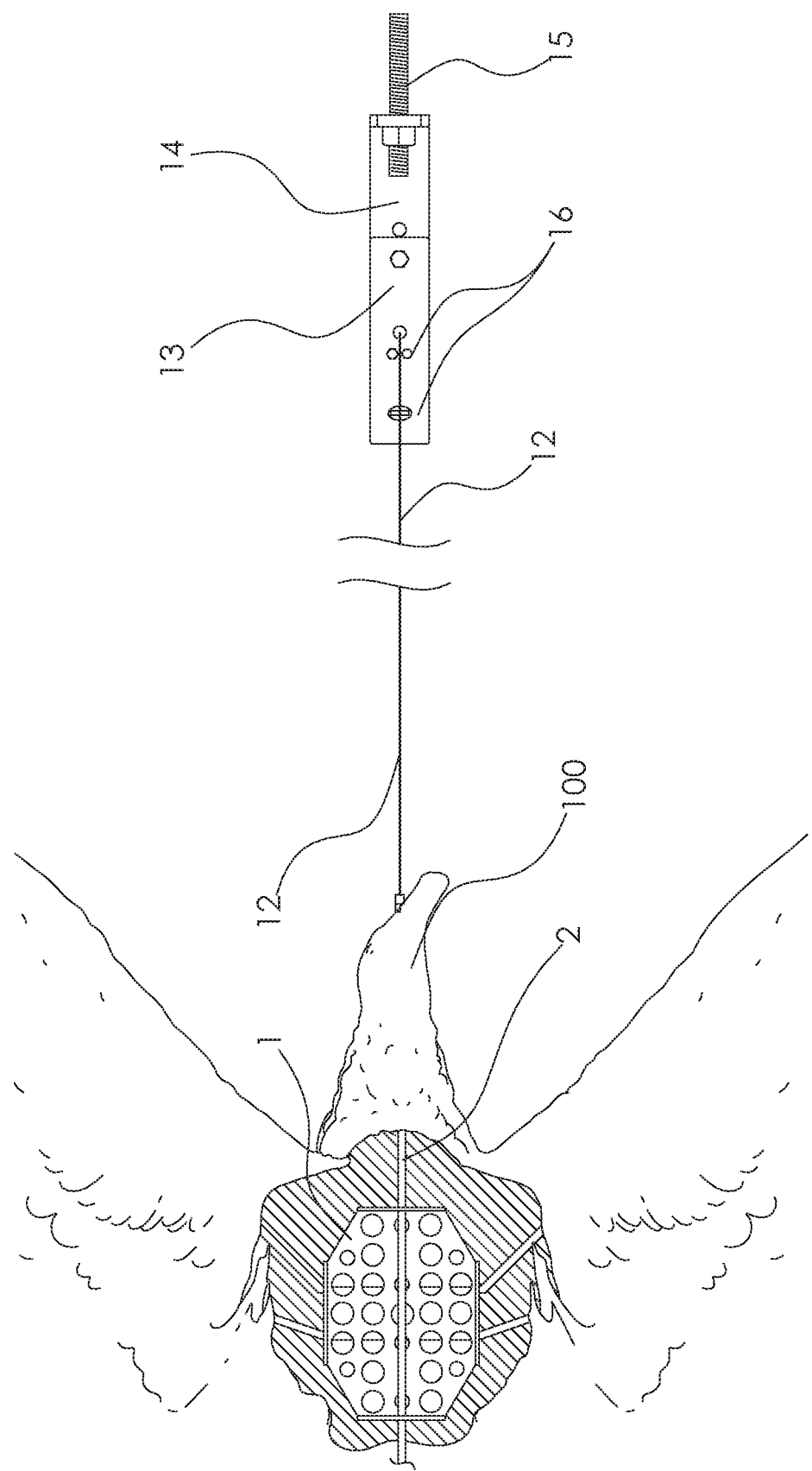
FIG. 3 depicts a perspective view of the curb filter of the invention after it has been inserted into a curb inlet.
Figure 4A:
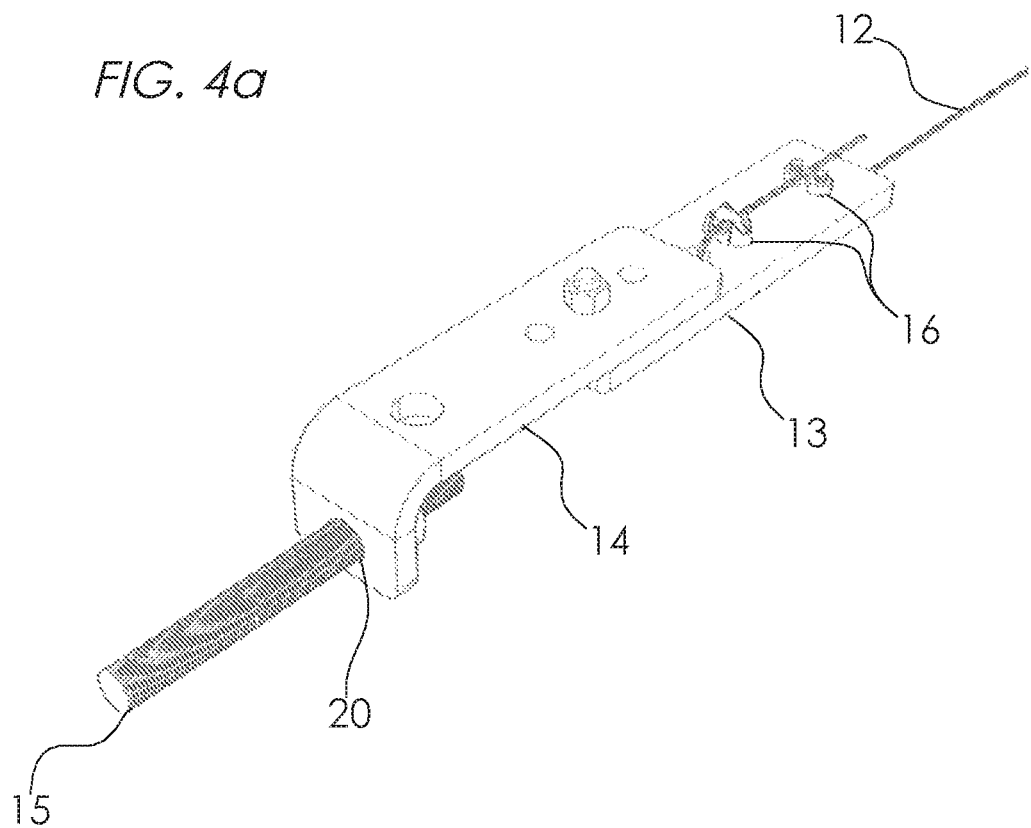
FIG. 4a depicts a perspective view from the front and side of the curb filter of the invention.
Figure 4B:
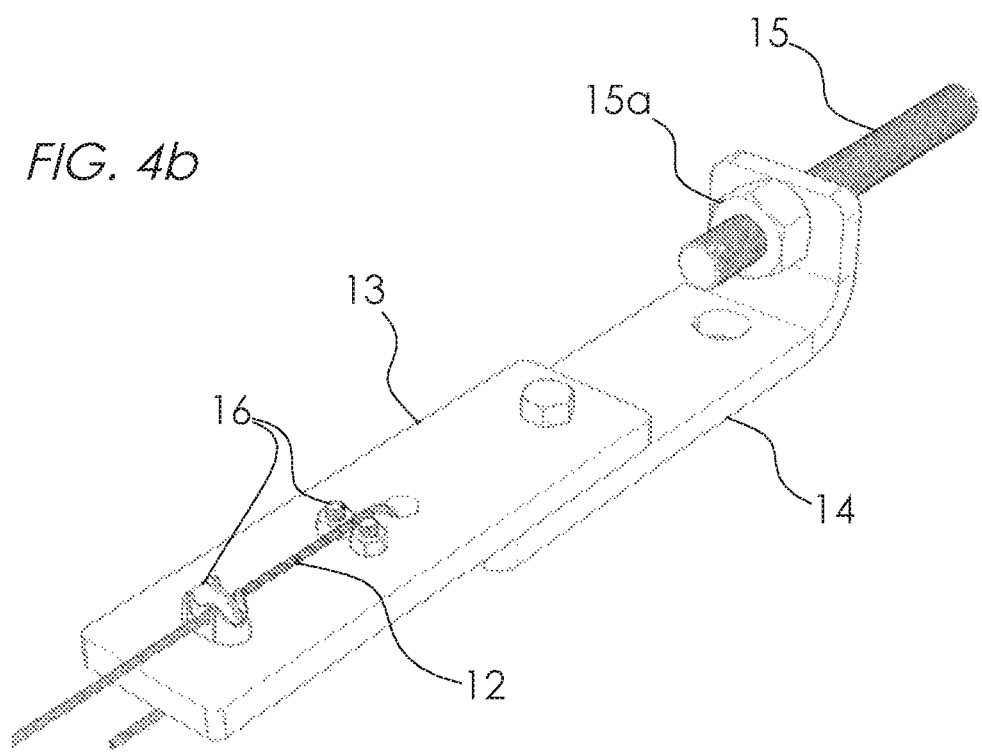
FIG. 4b depicts a perspective view from the front and side of the curb filter of the invention.

Referring now to FIG. 3, effigy 100 is depicted again in cutaway view showing the internal central structure element 1 and rod 2. Cable 12, which is connected to rod 2 extends to optional cable tightening feature comprising elements 13, 14, 15, and 16. These elements are further depicted in greater detail in FIGS. 4a and 4b. Referring now to FIGS. 4a and 4b, it can be seen that the tension in cable 12 can be adjusted by the tensioning means provided by use of at least one, and preferably a plurality of, cable clamp 16 mounted onto plate 13. Plate 13 may be bolted, welded or otherwise attached to L bracket 14 which comprises a threaded hole adapted to receive threaded rod 15 in a threaded engagement, allowing threaded rod 15 to be tightened against L bracket 14 by tightening nut 15a Using this feature of the invention, the effigy 100 may be suspended and cable 12 maybe placed into tension such that the effigy is prevented from swaying or swinging in the wind. Threaded rod 15 can be utilized to secure the apparatus to any structure. In this manner, an effigy can be suspended and cables 12 and 9 can be placed into tension, safely securing the effigy in place and preventing movement of the effigy caused by forces generated by wind, rain or other environmental forces.

Figure 5:
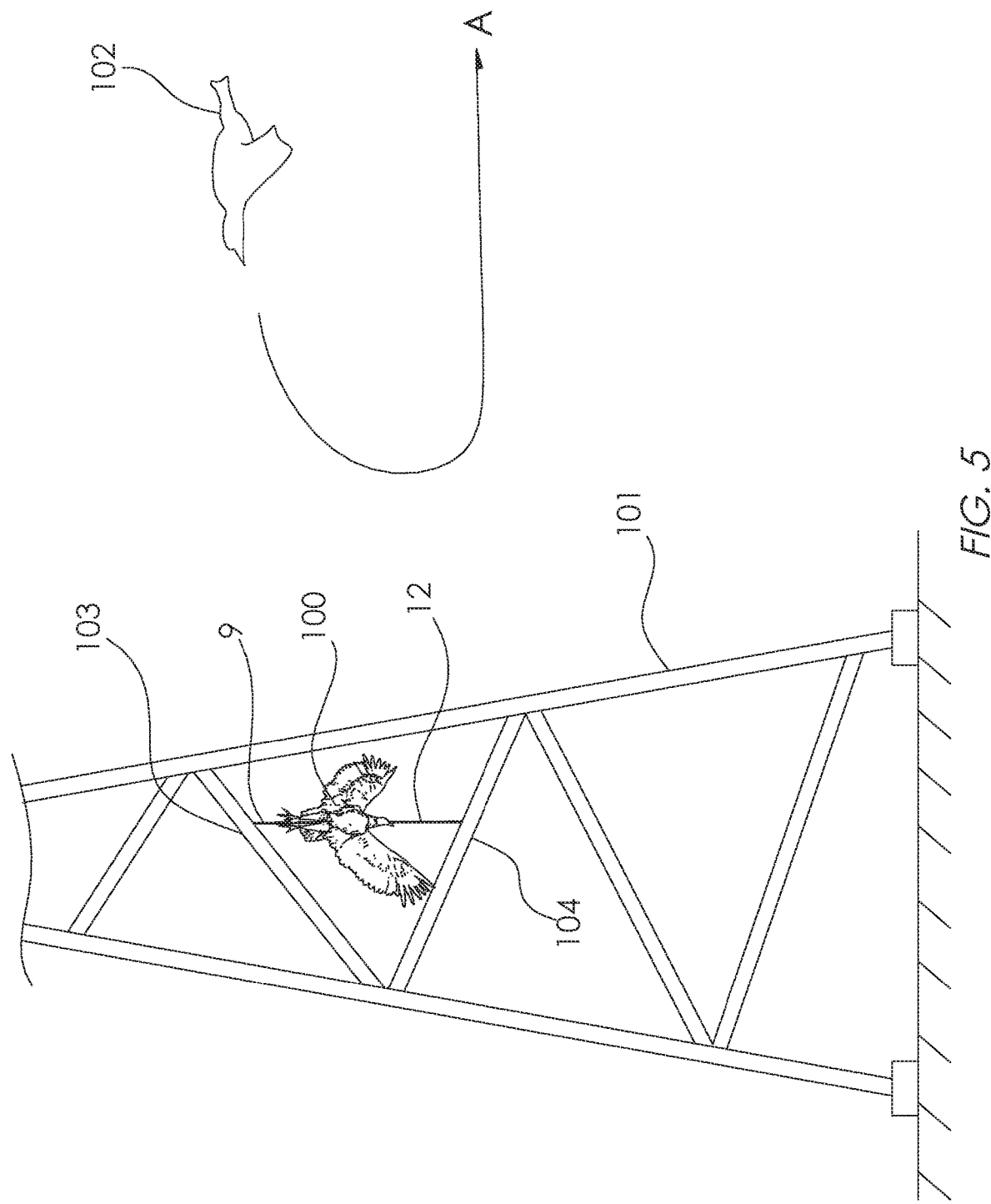
FIG. 5 depicts an exemplary use of an effigy of the invention in which the effigy is suspended upside down in order to repel unwanted birds from alighting on a subject structure.

Referring now to FIG. 5, an exemplary use of an effigy of the invention in which the effigy is suspended upside down from a subject structure in order to repel unwanted birds from alighting on the subject structure is depicted. Effigy 100, which can be an effigy of a dead bird such as dead vulture or turkey vulture, or any other fowl such as a turkey, is suspended from a subject structure 101. A first end of first cable 9 is attached to an upper suspending structure 103 which may be a portion of a cell or communication tower, tree or other structure 103 (depicted as a tower in FIG. 5), and a second end of first cable 9 is attached to optional extension rod 10 or rod 2 as hereinbefore described and depicted in FIG. 1. Second cable 12 may be attached on a first end to a lower suspending structure 104 and can comprise means for adjusting to provide tension in the cables in order to keep the effigy from swaying in the wind and causing damage to the structure, such as the tensioning means depicted in FIGS. 4a and 4b. In use, the effigy may cause an agitated state in approaching unwanted bird 102, causing unwanted bird 102 to fly away from the subject structure 101 as depicted by arrow A.

In an embodiment, the invention can also comprise a method for deterring birds or animals from an area, comprising the steps of: providing an effigy comprising an internal supporting structure having a distal and proximate ends; providing a first cable attached to the distal end and a second cable attached to the proximate end; suspending the effigy by attaching the first cable to an upper suspending structure, and attaching the second cable to a lower suspending structure; and tensioning said second cable such that the effigy does not sway due to environmental conditions. The method may also be further defined in that the effigy can be suspended in a head down disposition. The effigy can either be an effigy or replica of a live or dead animal, and it can be shaped in the form of a buzzard, vulture, osprey, hawk or eagle, and/or other birds of prey, and other birds and the like.

In still further embodiments, the effigy can be an effigy of a live bird or animal such as an eagle, osprey, hawk, or Coopers hawk. The live effigy can be presented in a heads up or other orientation, supported by a structure that rotatably attaches the bird to a supporting structure, allowing the live bird effigy rotate in such a manner that it weathervanes in the wind, meaning that it rotates due to the force of the wind on its surfaces such that it either faces into or away from the wind direction. Such effigies of live birds operate to present the appearance of a dominating territorial bird, which may repeal approaching unwanted birds. As an example, an effigy of a live bald eagle may be used to repel, or deter, an osprey from approaching a subject structure because the effigy of the live bald eagle presents a dominating presence to the osprey. Ospreys will not generally nest under a bald eagle.

Any of the effigies described herein may take the form of a vulture, turkey vulture, black vulture, buzzard, osprey, eagle, hawk, owl or Coopers hawk.

Figure 6A:
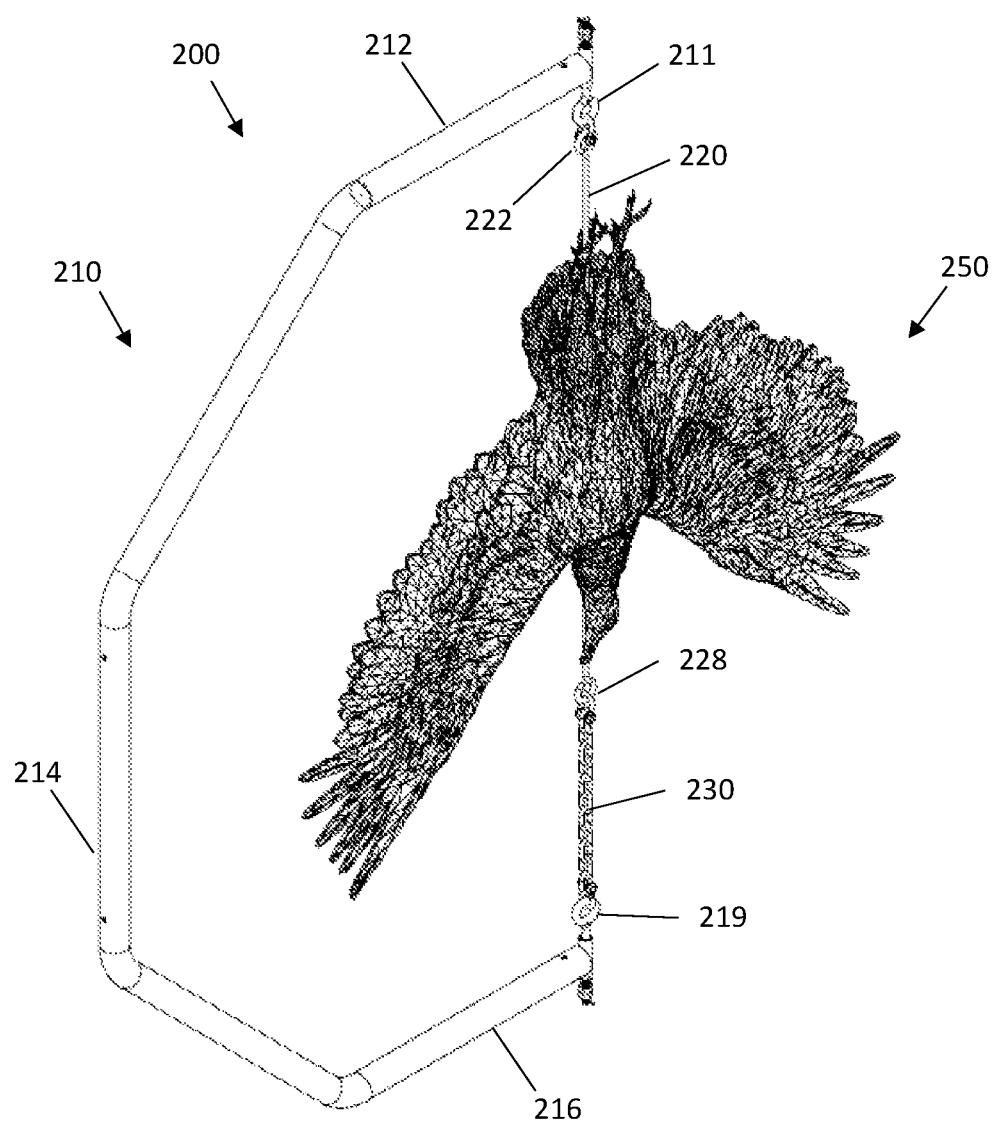
FIG. 6A is a perspective front view of another embodiment of a C shaped hanger bracket with upside down suspended bird replica effigy.
Figure 6C:
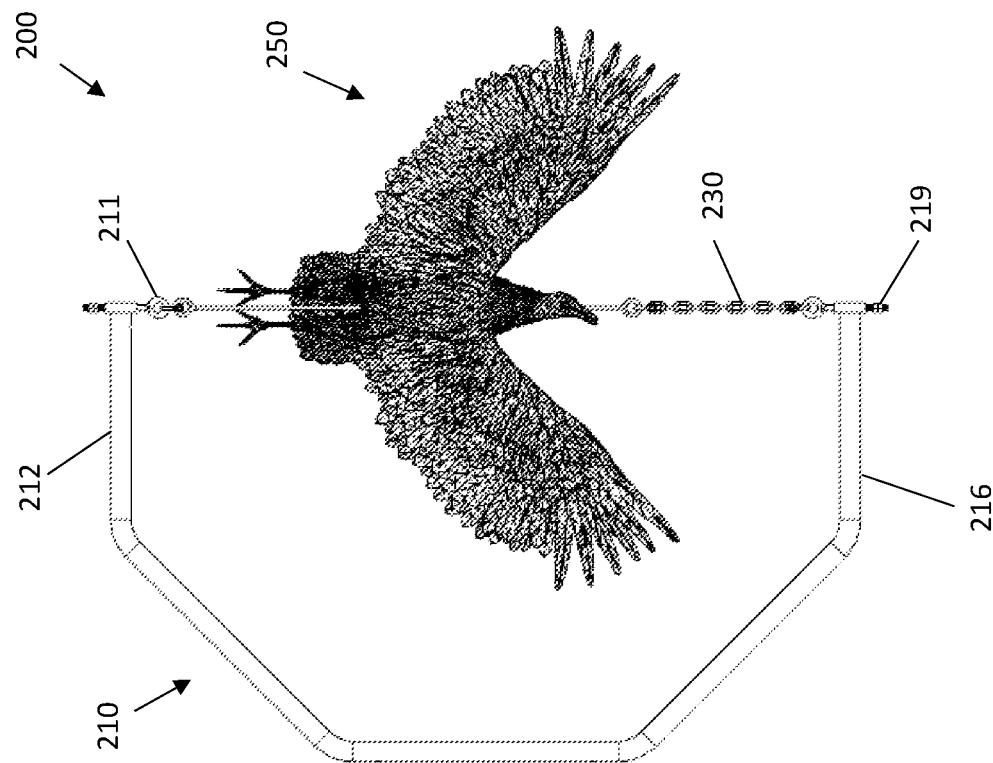
FIG. 6C is a front view of the C shaped hanger bracket with upside down suspended bird replica effigy shown in FIG. 6A.
Figure 6B:
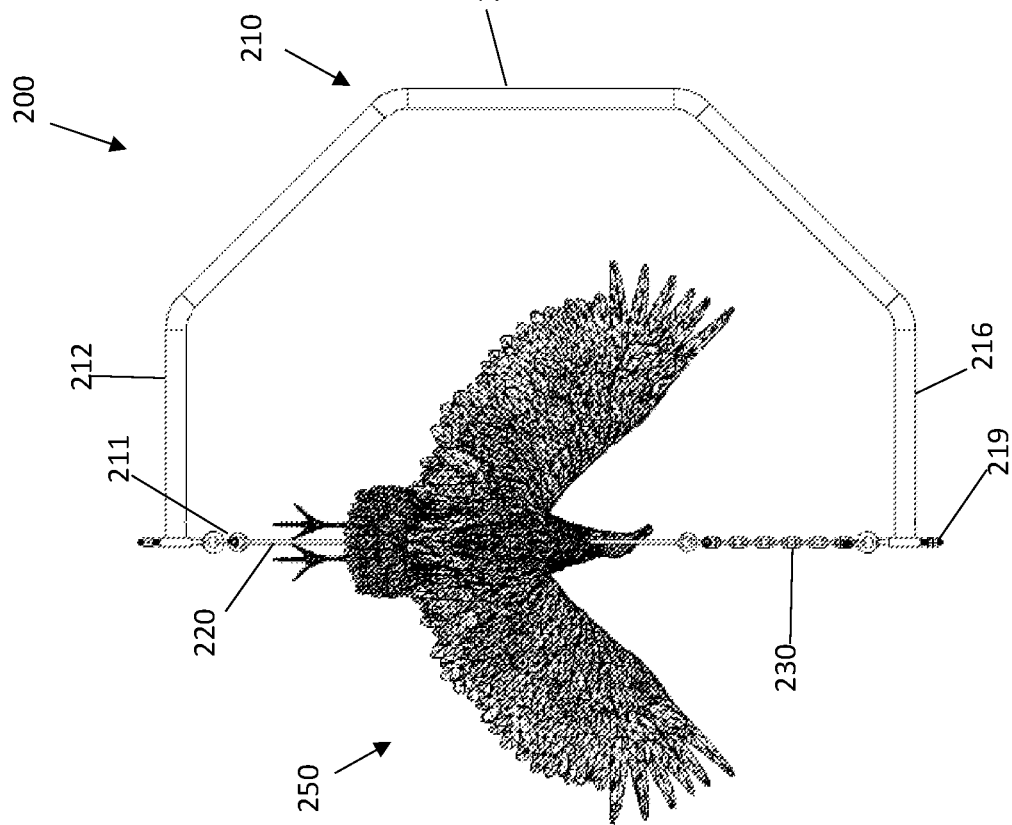
FIG. 6B is a rear view of the C shaped hanger bracket with upside down suspended bird replica effigy shown in FIG. 6A.

FIG. 6A is a perspective front view of another embodiment 200 of a C shaped hanger bracket 210 with upside down suspended bird replica effigy 250 FIG. 6B is a rear view of the C shaped hanger bracket 210 with upside down suspended bird replica effigy 250 shown in FIG. 6A. FIG. 6C is a front view of the C shaped hanger bracket 210 with upside down suspended bird replica effigy 250 shown in FIG. 6A.

FIG. 7A is a perspective view of the C shaped hanger bracket 210 shown in FIG. 6A. FIG. 7B is a front view of the C shaped hanger bracket 210 shown in FIG. 7A. FIG. 7C is a left side view of the C shaped hanger bracket 210 shown in FIG. 7A. FIG. 7D is a top view of the C shaped hanger bracket 210 shown in FIG. 7A.

Figure 8A:
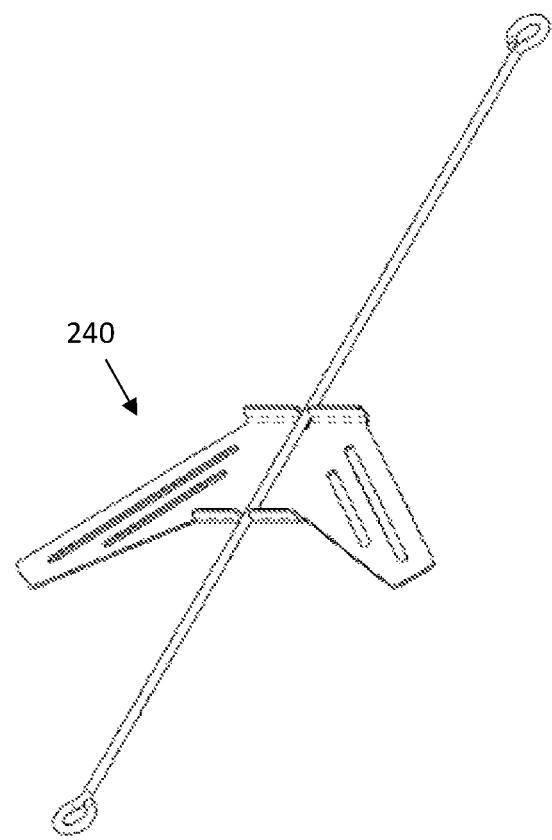
FIG. 8A is a perspective front view of the support rod and wing armature plate used to support the suspended bird in the C shaped bracket shown in FIG. 7A.

FIG. 8A is a perspective front view of the elongated support rod 220 and wing armature plate 240 used to support the suspended bird replica effigy 250 in the C shaped bracket 210 shown in FIG. 7A. FIG. 8B is a front view of the elongated support rod 220 and wing armature plate 240 of FIG. 8A. FIG. 8C is a side view of the elongated support rod 220 and wing armature plate 240 of FIG. 8A. FIG. 8D is a top view of the elongated support rod 220 and wing armature plate 240 of FIG. 8A.

Figure 9A:
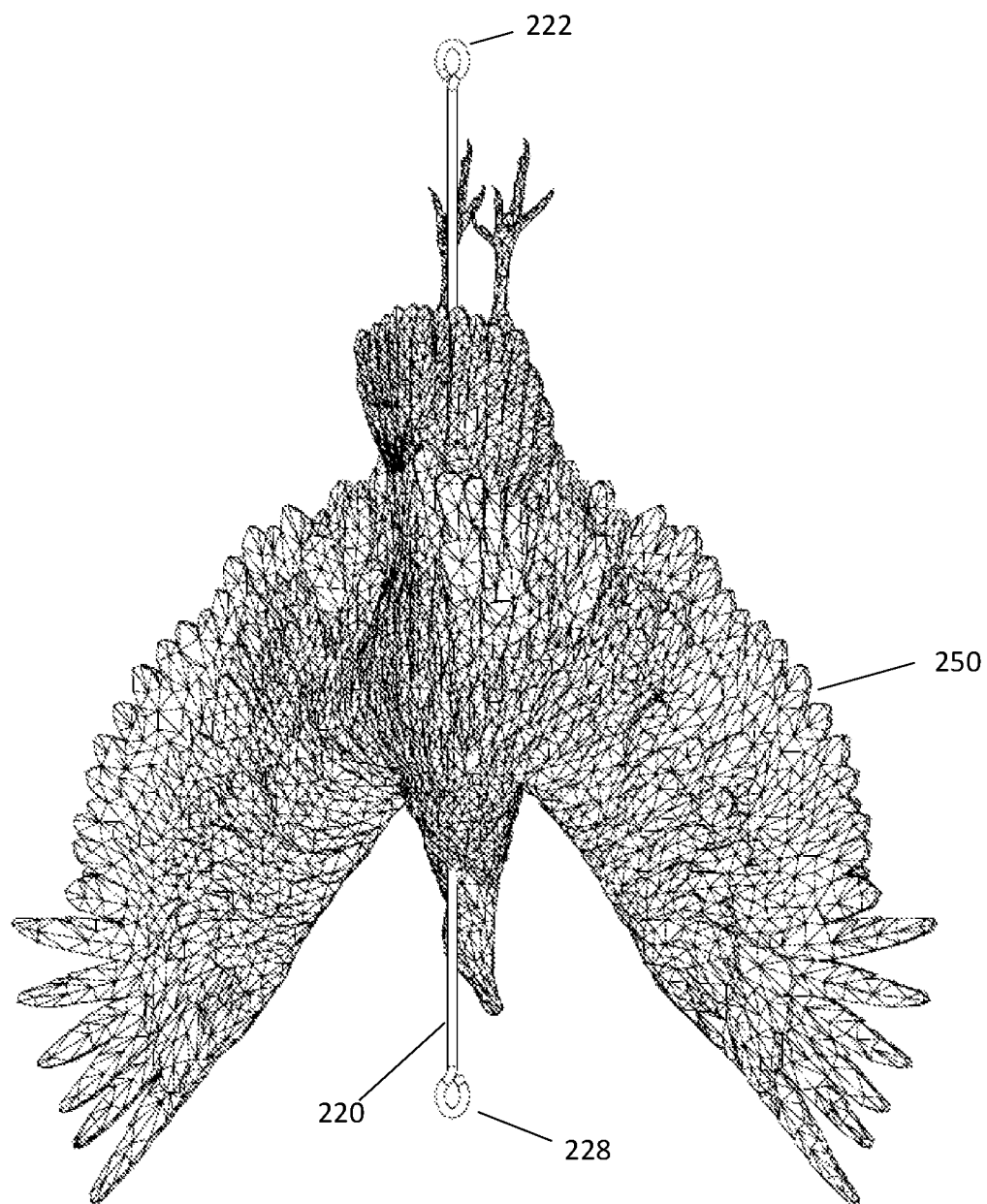
FIG. 9A is a front perspective view of the support rod and armature plate of FIG. 8A mounted in the suspended bird.

FIG. 9A is a front perspective view of the elongated support rod 220 and wing armature plate 240 of FIG. 8A mounted in the suspended bird replica effigy 250. FIG. 9B is a front view of the elongated support rod 220 and wing armature plate 240 of FIG. 8A mounted in the suspended bird replica effigy 250 of FIG. 9A. FIG. 9C is a side view of the elongated support rod 220 and wing armature plate 240 of FIG. 8A mounted in the suspended bird replica effigy 250 of FIG. 9A.

Referring to FIGS. 6A-9C a C shaped hanger bracket 210 that can be formed from metal, such as but not limited to galvanized steel, stainless steel and the like. The bracket 210 can be formed from one pipe being bent into a C shape. Alternatively, the C shaped bracket can be formed from straight pipe sections having upper legs 212 and back leg 214 and lower legs 216 that can be welded together, and the like. The top outer end and bottom outer end can have through-holes to allow for a top eye bolt 211 and bottom eye bolt 219 to be mounted therein, by screwable threads.

An elongated support rod 220 can have an upper end with an upper hook 222 and lower end with a lower hook 228. A wing shaped armature plate 240 can have a top bent edge 242 and bottom bent edge 248 with the edges having openings therethrough for allowing a midportion of the elongated support rod to pass therethrough. The bent edges 242, 248 can be also attached to the mid portion of the rod 220 by welding, and the like. The rod 220 and wing shaped armature plate 240 can also be formed from metal, such as but not limited to galvanized steel, stainless steel and the like.

In one preferred embodiment a mold having a shape of a bird effigy can have the wing shaped armature plate 240 placed into the mold with the pre-attached elongated rod 220. The lower part of the elongated rod 220 can be intended to extend from a head portion of the bird replica effigy, with an upper part of the rod 220 extending out from a rear portion of the bird replica effigy 250. Material, such as but not limited to resin, plastic, and the like can be injected into the mold. The material can cure about the wing plate 240 passing into the parallel slots 245, about the bent edges 242, 244, and about the side wings 244 which can partially extend into the wings of the bird replica effigy 250. The injected material can lock to the wing plate 240 and elongated rod 220 when the material cures. The result can have the lower part of the elongated rod 220 can be intended to extend from a head portion of the bird replica effigy 250, with an upper part of the rod 220 extending out from a rear portion of the bird replica effigy 250.

For the final assembly, the upper hook 22 on the elongated rod 220 with upside down bird replica effigy 250 can be attached to the top eye bolt 211 attached to an upper leg 212 of the C shaped bracket 210. The lower hook 228 on the bottom of the elongated rod 220 can be attached to one end of a chain 230. The opposite end of the chain 230 can be attached to a bottom eye bolt 219 which is attached to a lower leg 216 of the C shaped bracket 210.

Figure 10:
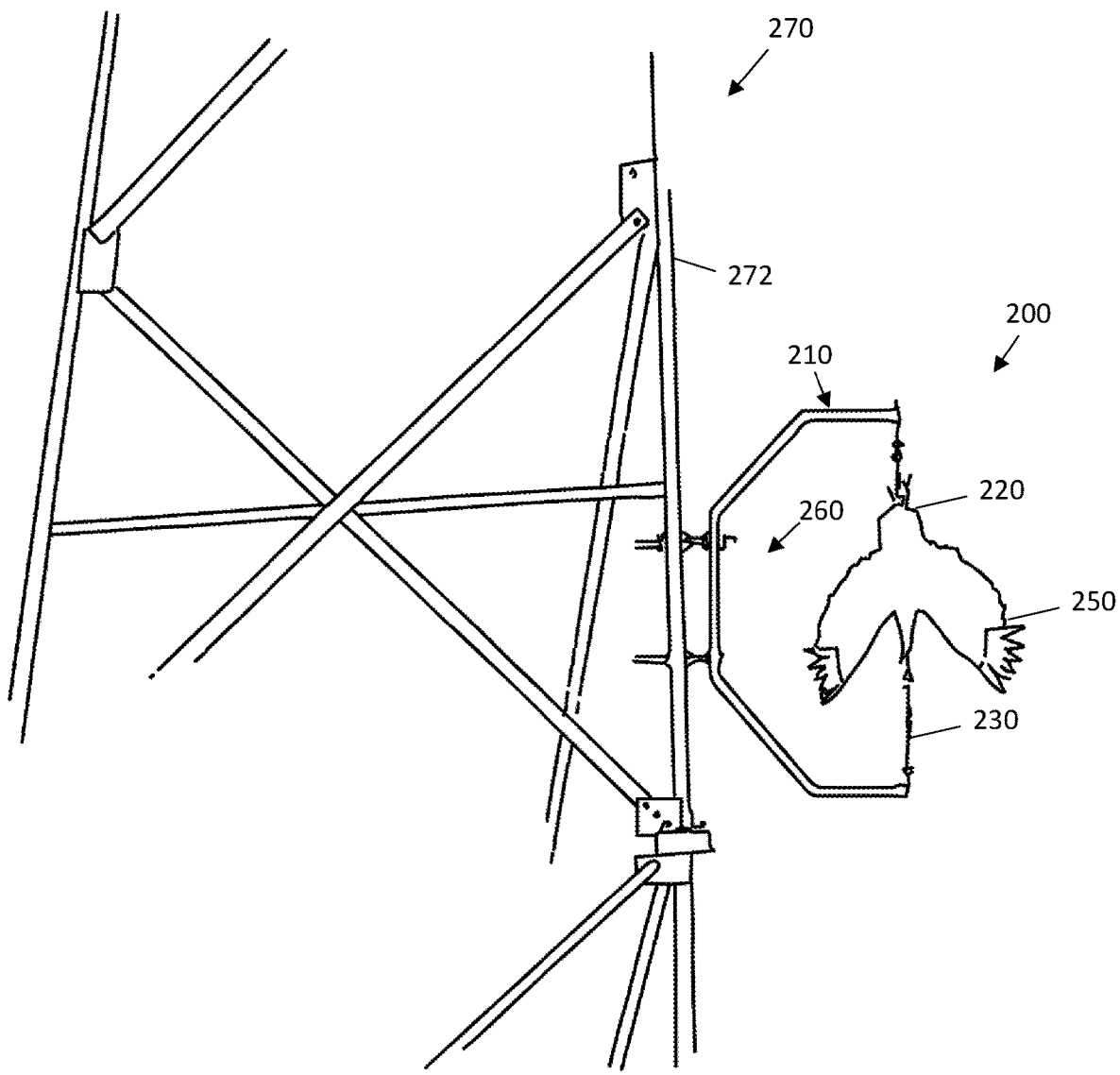
FIG. 10 is a perspective view of the C shaped hanger bracket with mounted upside-down suspended bird replica effigy of FIGS. 6A-9C mounted to a cell/communications tower

FIG. 10 is a perspective view of the C shaped hanger bracket 210 with mounted upside down suspended bird replica effigy 250 of FIGS. 6A-9C mounted to a tower structure 270.

Referring to FIGS. 6A-10, back leg 214 of the C shaped bracket 210 can be attached to a vertical support 272 on a cell/communication tower 272 by known techniques, such as but limited to clamps, such as a pipe to pipe clamp set 260 shown in FIGS. 11A, 11B and 11C.

When mounted, the bird replica effigy 250 is somewhat loose based on the hooks 222, 228 and eye bolt fasteners 211, and chain 230. Wind allows the bird replica effigy 250 move in place with vibrations and oscillations. The wing spans on the bird replica effigy 250 can also partially rotate relative to the C shaped bracket 210. The movements of the upside down bird replica effigy 250 can appear to look like a bird struggling in place to live birds, which would deter similar live birds from approaching the structure 270 that the bird replica effigy 250 is mounted to.

FIG. 11A is an enlarged front view of a prior art pipe to pipe clamp mount 260 used to attach the C shaped hanger bracket 200 to the support leg 272 on the cell/communications tower shown 270 in FIG. 10. FIG. 11B is a left side view of the pipe to pipe clamp mount 260 of FIG. 11A. FIG. 11C is a top view of the pipe to pipe clamp mount 260 of FIG. 11A. The clamp mount 260 can have two pairs of curved flange plates with one pair wrapped about the back leg 214 of the C shaped bracket 210, and the other pair of curved flange plates wrapped about a vertical support 272 on the cell/communications tower 270. Threaded rods with nuts that can thread thereon can then attach the C shaped hanger bracket 200 to the vertical tower 270

In one embodiment, the C shaped bracket 210 can have a height of approximately 69 inches and a width of approximately 40 inches. The bird replica effigy 250 can have a length of less than approximately 69 inches and a spread wing span of approximately 34 inches.

Figure 12A:
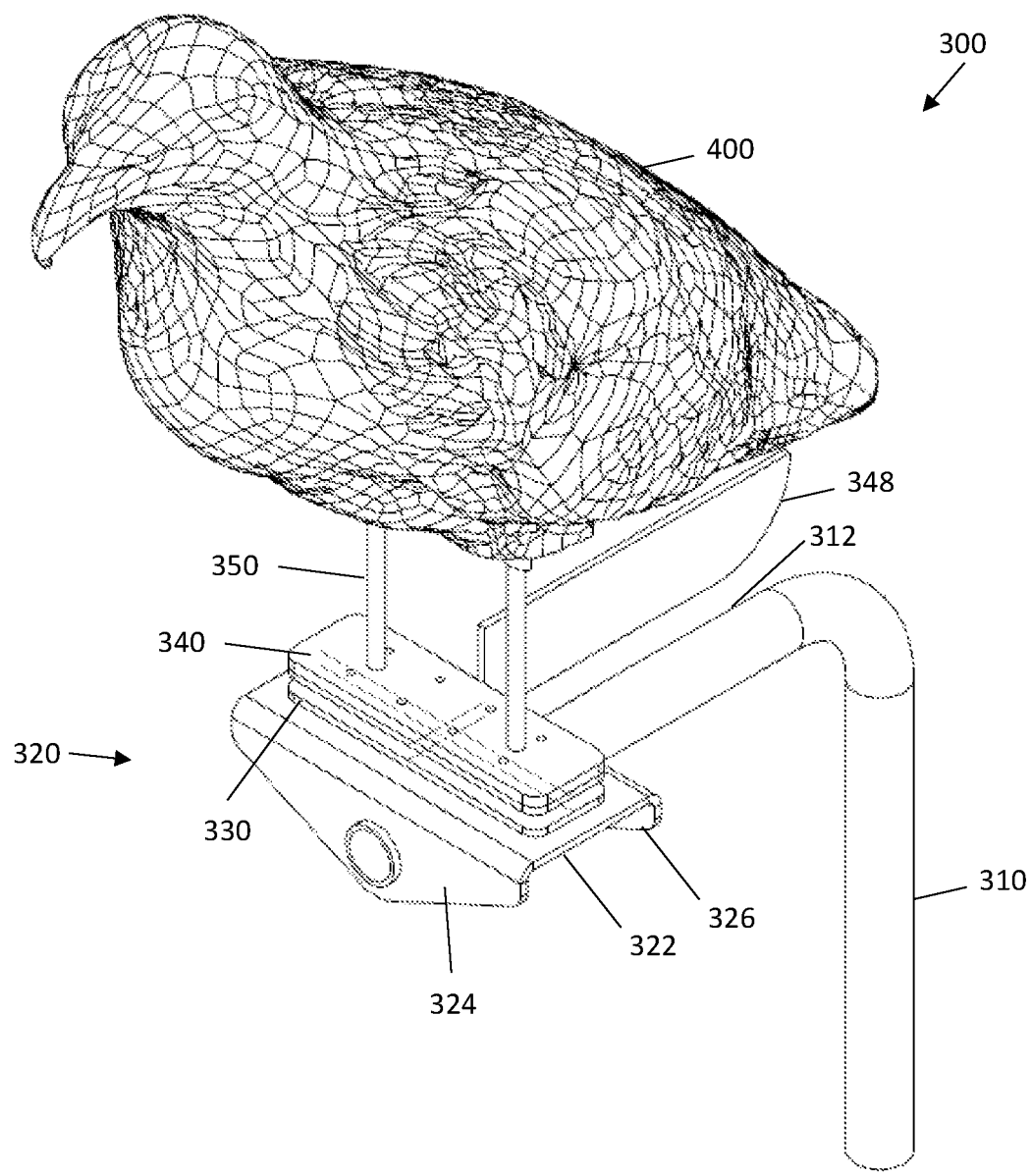
FIG. 12A is an upper front right side perspective view of a stand support for a moveable bird effigy replica embodiment.
Figure 12B:
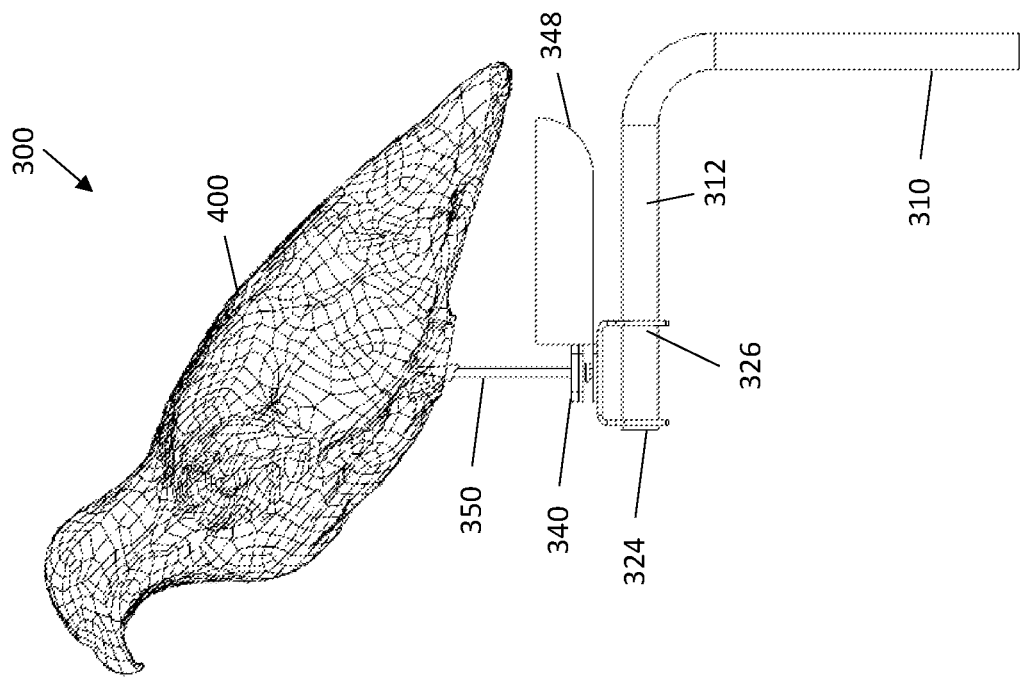
FIG. 12B is a right side view of the stand support for a moveable bird effigy replica embodiment of FIG. 12A.
Figure 12C:
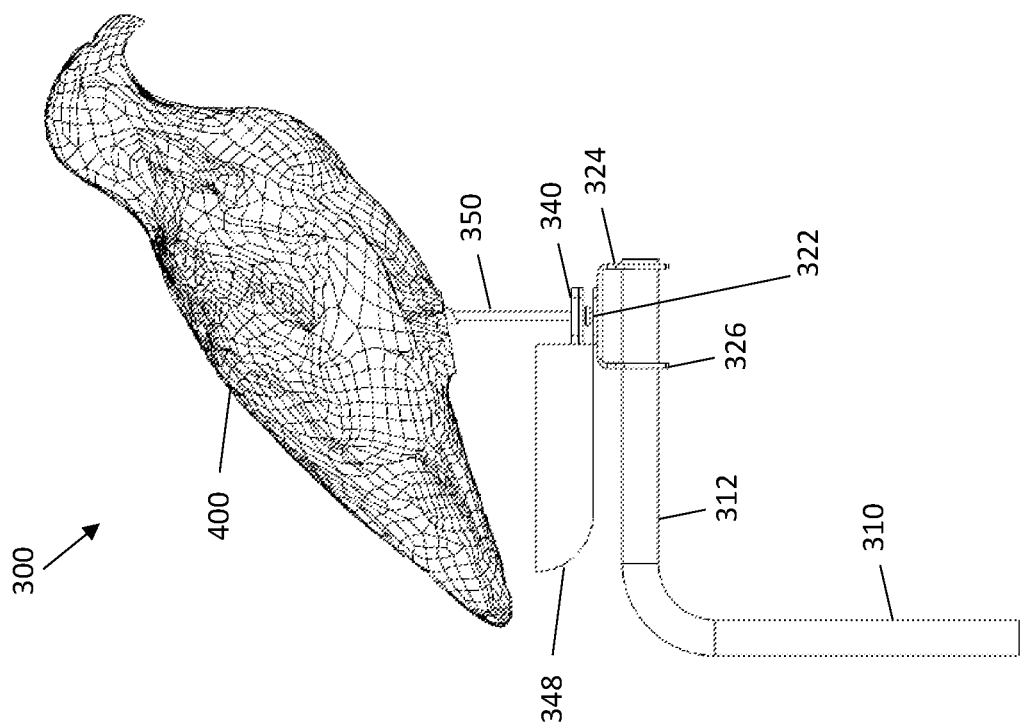
FIG. 12C is a left side view of the stand support for a moveable bird effigy replica embodiment of FIG. 12A.
Figure 12D:
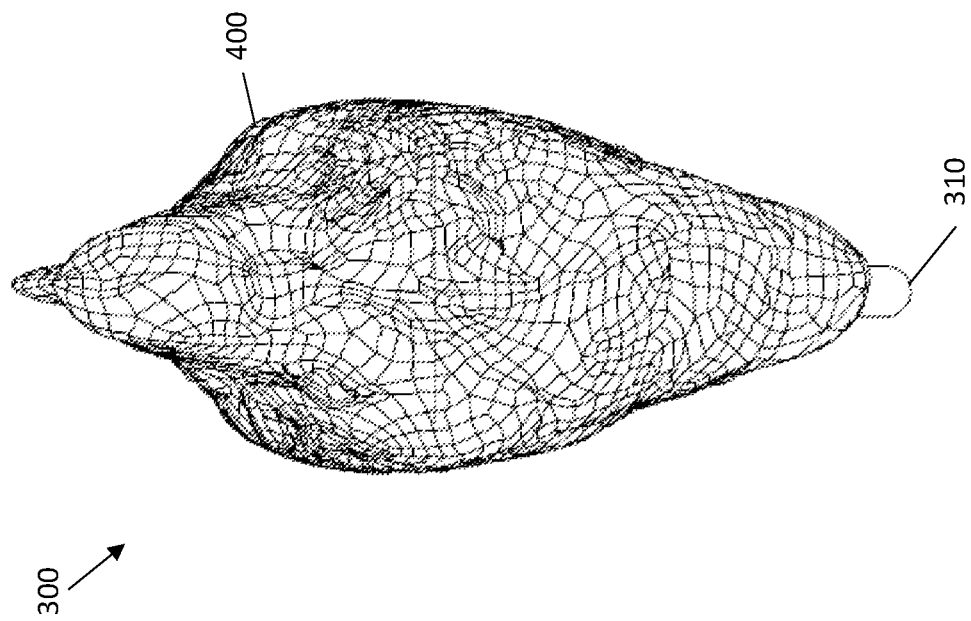
FIG. 12D is a top view of the stand support for a moveable bird effigy replica embodiment of FIG. 12A.
Figure 12E:
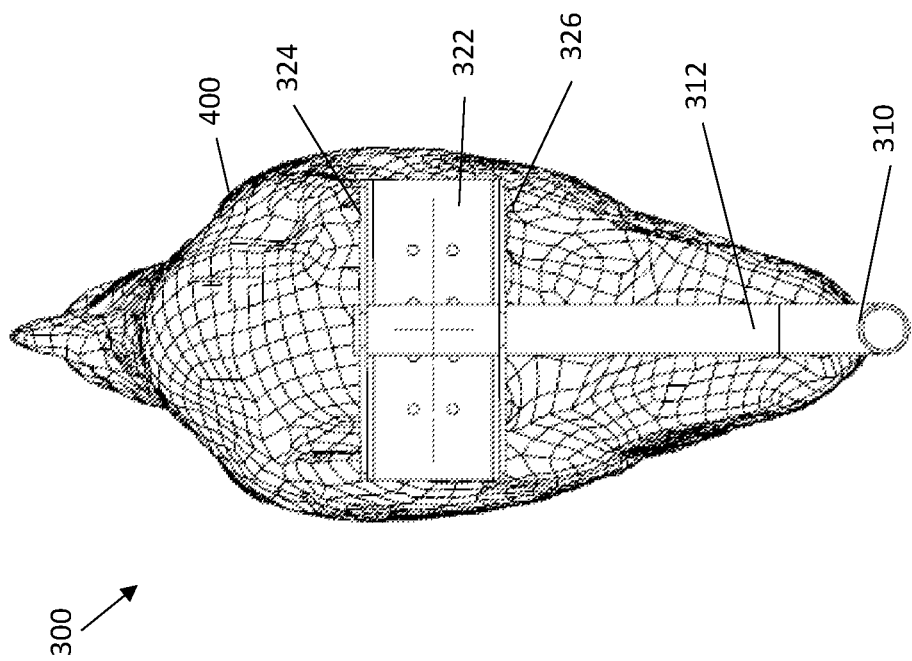
FIG. 12E is a bottom view of the stand support for a moveable bird effigy replica embodiment of FIG. 12A.

FIG. 12A is an upper front right side perspective view of a stand support for a moveable bird effigy replica embodiment 300. FIG. 12B is a right side view of the stand support for a moveable bird effigy replica embodiment 300 of FIG. 12A. FIG. 12C is a left side view of the stand support for a moveable bird effigy replica embodiment 300 of FIG. 12A. FIG. 12D is a top view of the stand support for a moveable bird effigy replica embodiment 300 of FIG. 12A. FIG. 12E is a bottom view of the stand support for a moveable bird effigy replica embodiment 300 of FIG. 12A.

Figure 13B:
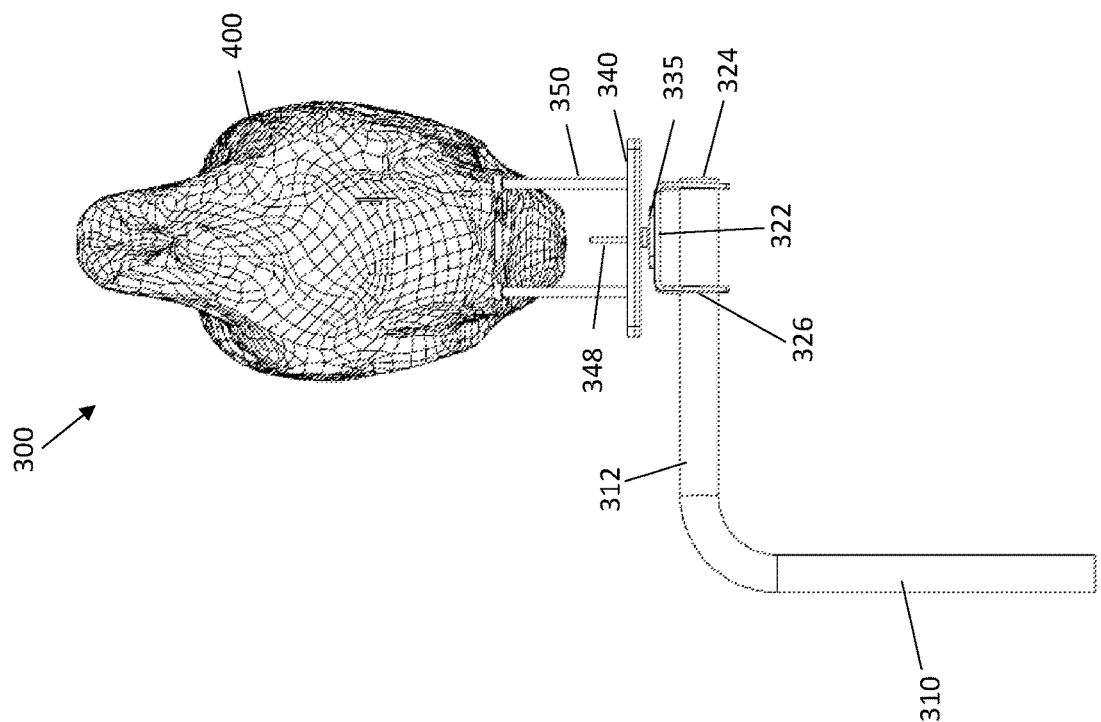
FIG. 13B is another right side view of the stand support for a moveable bird effigy replica embodiment of FIG. 13 with the effigy rotated ninety degrees.
Figure 13A:
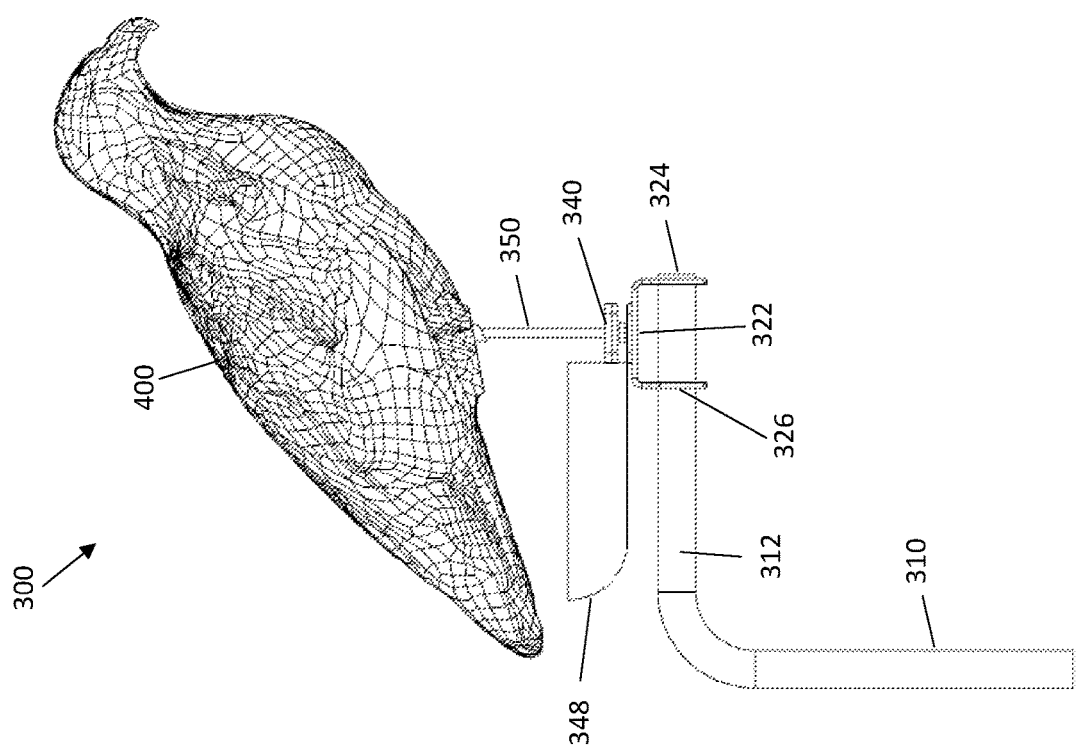
FIG. 13A is another right side view of the stand support for a moveable bird effigy replica embodiment of FIG. 12A with the effigy facing to the right.

FIG. 13A is another right side view of the stand support for a moveable bird effigy replica embodiment 300 of FIG. 12A with the effigy 400 facing to the right. FIG. 13B is another right side view of the stand support for a moveable bird effigy replica embodiment 300 of FIG. 13 with the effigy 400 rotated ninety degrees.

FIG. 14A is a front head view of the stand support for a moveable bird effigy replica embodiment 300 of FIG. 12A with effigy 400 head end raised. FIG. 14B is a cross-sectional view of the stand support for a moveable bird effigy replica embodiment 300 of FIG. 14A along arrows 14B.

FIG. 14C is a left side view of the stand support for a moveable bird effigy replica embodiment 300 of FIG. 14B without the effigy 400.

FIG. 15A is another front head view of the stand support for a moveable bird effigy replica embodiment 300 of FIG. 12A with effigy 400 head end lowered. FIG. 15B is a cross-sectional view of the stand support for a moveable bird effigy replica embodiment 300 of FIG. 15A along arrows 14B. FIG. 15C is a left side view of the of the stand support for a moveable bird effigy replica embodiment 300 of FIG. 14B without the effigy 400.

Figure 16:
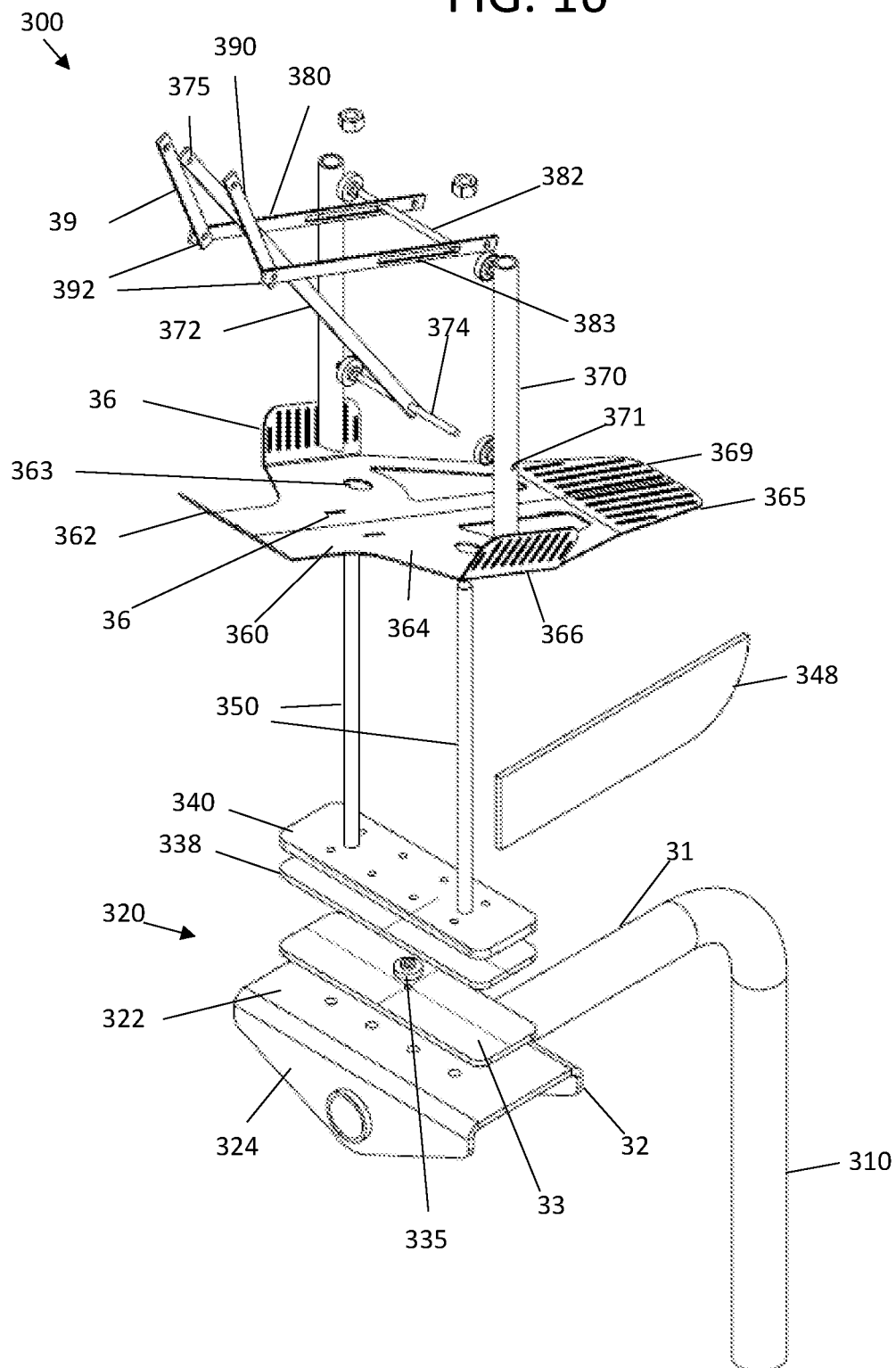
FIG. 16 is an enlarged exploded view of the components of the stand support for a moveable bird effigy replica embodiment referenced in the previous FIGURES without the effigy 400.

FIG. 16 is an enlarged exploded view of the components of the stand support for a moveable bird effigy replica embodiment 300 referenced in the previous FIGURES without the effigy 400.

Referring to FIGS. 12A-16, this embodiment can include a vertical post 310 having an upper horizontal leg 312, that can be formed form metal such as but not limited to galvanized metal, stainless steel and the like. A single pipe can have an upper bent portion. Alternatively, the vertical post 310 can be welded to the horizontal leg 312.

A ledge mounting armature metal plate 320 can have a front bent edge 322 and a rear bent edge 324, and top plate portion 322. The horizontal leg 312 can pass through holes in the front bent edge 322 and a rear bent edge 324, and be attached together by welding, and the like. The armature metal plate 320 can be made from galvanized metal, stainless steel and the like.

Fixably attached to the upper surface of the top plate portion 322 of the armature plate 320 can be a bottom swivel mount metal base plate 330. Bearing(s) 335 can separate the bottom swivel base plate 330 from an upper swivel mount metal base plate 338. Fixably attached to the top surface of the upper swivel mount metal base plate 338 can be an effigy metal base 340. A rear facing rudder 348 can be fixably attached to a back of both the metal base plate 338 and metal base 340.

Extending upward from the effigy metal base 340 can be a pair of metal effigy support legs 350 attached thereto. The upper ends of the support legs 350 can pass through the support holes 363 in the effigy body armature plate and insert into the lower ends of hollow effigy vertical support rods 370.

The effigy body armature metal plate 360 can be formed underneath or within the lower body part of the effigy 400 and be molded to the effigy 400 as described in the previous embodiment. The effigy body armature metal plate 360 can have a tip portion 362 extending under a neck portion of the bird replica effigy 440, side wings 364 with bent wing edges 366 extending under wing portions of the bird effigy replica 440, and rear portion 369 extending under the tail portion of the bird replica effigy 400. Slots 365 in the armature plate 360 can allow for bottom portions of the molded effigy 400 to better adhere together.

Inside a hollowed out portion 405 of effigy 440 can be a horizontal axle 374 having rotatable ends which pass into openings 371 in inner side portions of effigy vertical support rods 370. Extending upward from the rotatable axle 374 can be a rocker arm 372 having an upper end pivotally attached to upper ends 376 of front support posts 390. The bottom ends 392 of front support posts 390 can be pivotally attached outer ends of horizontal slider arms 380. Elongated slots 383 along inner ends of horizontal slider arms 380 can allow for the horizontal slider arms 380 to slide about rotatable effigy support axle 386. The rotatable effigy support axle 386 has outer ends pivotally attached to inner portions of upper ends of the effigy vertical support rods 370.

Parts and plates, and other components are preferably made of metal, such as but not limited to galvanized steel, stainless steel, and the like. Other types of material, can possibly be made of plastic, and the like.

Referring to FIGS. 12A, 13A, 13B, 14A, 14B, 15A, 15B, 16 and 10, the vertical post 310 can be mounted to a vertical support 272 on a tower 270 by pipe to pipe clamp mount 260. When mounted, wind pushing against one side of rudder 348 can allow for the bird replica effigy 400 to rotate relative to the ledge portion of the horizontal leg 312 by the bearing(s) 335 between upper swivel mount base plate 338 and bottom swivel base plate 330 on the armature plate 320 attached to the horizontal leg 312. The rudder 348 can function similar to a weather vane, which make the bird replica effigy, such as a bird of prey, which can include but is not limited to an eagle appear alive.

Referring to FIGS. 12A-12C, 14A-14C, 15A-15C and 16, wind pushing against a back of the bird replica effigy 400 can cause the effigy head portion to pivot down. The upper ends of the front support posts 390 can be mounted to an inner surface within a hollowed out inside head portion of the effigy 400. The effigy head portion can pivot downward by the bottom ends of front support posts 390 pivoting at 392 to outer ends of horizontal arms 380 while inner slots 383 slide about rotatable axle 383 which rotates relative to vertical support rods 370. And the effigy head portion also pivots downward based on outer ends of front support posts 390 pivoting with the upper end of rocker arm 372 which has a lower end which rotates relative to rotatable axle 374 which is also rotatably attached to vertical support rods 370.

The term "approximately"/"approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A hanger system with a moving bird effigy replica, for deterring birds, comprising:
    a C-shaped hanger bracket having an upper end and a lower end;
    a bird effigy supported in the hanger bracket between the upper end and the lower end; and
    an elongated rod having a top and a bottom, the rod passing through the effigy, so that the top is rotatably attached to the upper end of the C shaped bracket, and the bottom is rotatably attached to the lower end of the C shaped bracket;
    an armature plate imbedded inside of the effigy, the armature plate attached to a mid portion of the elongated rod between the top and the bottom; and
    a mount mechanism for attaching the hanger bracket to a support structure, wherein the bird effigy is movable within the hanger bracket.

2. The hanger system of claim 1, wherein the top of the elongated rod includes a top hook, and the bottom of the elongated rod includes a bottom hook.

3. The hanger system of claim 1, wherein the armature plate includes:
    a wing shape configuration.

4. The hanger system of claim 1, further comprising:
    a chain attached between the bottom of the elongated rod and the lower end of the C shaped bracket.

5. The hanger system of claim 1, wherein the mount mechanism includes:
    a clamp for attaching the hanger system to the support structure.

6. A stand system with a moving bird effigy replica, for deterring birds, comprising:
    a post having an upper end with a ledge, and a lower end;
    a bird effigy;
    an armature plate imbedded in the bird effigy;
    a movable mechanism for attaching the bird effigy to the ledge on the post, the movable mechanism for allowing the bird effigy to both rotate relative to the ledge on the post, and to pivot up and down relative to the ledge on the post; and
    a mount mechanism for attaching the post to a structure.

7. The stand system of claim 6, wherein the moveable mechanism includes:
    bearings for allowing the bird effigy to rotate relative to the ledge.

8. The stand system of claim 6, further comprising:
    a rudder extending rearwardly from the bird effigy, wherein wind against the rudder allows the bird effigy to rotate relative to the ledge on the post.

9. The stand system of claim 6, wherein the moveable mechanism includes:
    pivoting rods attached to the armature plate and to the ledge on the post.

10. A bird effigy replica, for deterring birds, comprising:
    a molded bird effigy;
    an armature plate imbedded inside of the molded bird effigy, the armature plate having slots for increasing adherence of the molded bird effigy to the armature plate;
    a hanger bracket having an upper end and a lower end, the armature plate with molded bird effigy being supported in the hanger bracket between the upper end and the lower end; and
    a mount mechanism for attaching the molded bird effigy with the armature plate to a support structure.

11. The bird effigy replica of claim 10, wherein the armature plate further includes:
    a wing shape.

12. The bird effigy replica of claim 10, wherein the armature plate further includes:
    bent wing edges on opposite sides of a central plate portion.

13. The bird effigy replica of claim 12, wherein the armature plate further includes:
    a rear portion extending reward from the central plate portion.

14. The bird effigy replica of claim 12, wherein the armature plate further includes:
    a bent tip portion on a front of the central plate portion.

* * * * *